United States Patent [19]

Kunishige

[11] Patent Number: 5,294,802
[45] Date of Patent: Mar. 15, 1994

[54] DIGITALLY ACTIVE DISTANCE MEASUREMENT APPARATUS FOR CAMERA OR THE LIKE

[75] Inventor: Keiji Kunishige, Tokyo, Japan

[73] Assignee: Olympus Optical Co., Ltd., Tokyo, Japan

[21] Appl. No.: 980,688

[22] Filed: Nov. 24, 1992

[30] Foreign Application Priority Data

Nov. 25, 1991 [JP] Japan .................................. 3-309073
Mar. 23, 1992 [JP] Japan .................................. 4-065352

[51] Int. Cl.⁵ .......................................... G01N 21/86
[52] U.S. Cl. .......................................... 250/561; 356/1
[58] Field of Search ................. 250/561, 201.6; 356/1, 356/4

[56] References Cited

U.S. PATENT DOCUMENTS

| | | | |
|---|---|---|---|
| 4,828,383 | 5/1989 | Kunishige et al. | 356/1 |
| 4,937,604 | 6/1990 | Yoshida et al. | 354/266 |
| 5,005,970 | 4/1991 | Kunishige | 356/1 |
| 5,131,740 | 7/1992 | Maekawa | 356/1 |
| 5,136,148 | 8/1992 | Nonaka | 250/201.4 |
| 5,148,211 | 9/1992 | Kotani et al. | 356/1 |
| 5,185,517 | 2/1993 | Inamori et al. | 250/201.4 |

FOREIGN PATENT DOCUMENTS

| | | |
|---|---|---|
| 1-150809 | 6/1989 | Japan . |
| 1-224617 | 9/1989 | Japan . |
| 1-240812 | 9/1989 | Japan . |
| 1-244310 | 9/1989 | Japan . |
| 2-195203 | 8/1990 | Japan . |
| 4-66810 | 3/1992 | Japan . |

Primary Examiner—David C. Nelms
Assistant Examiner—T. Davenport
Attorney, Agent, or Firm—Frishauf, Holtz, Goodman & Woodward

[57] ABSTRACT

In the first aspect, light reflected by an object upon projection of a beam on the object is received by a light-receiving section. A photocurrent corresponding to the irradiated position is detected by a photocurrent detection section and is compared with a predetermined level by a comparison/determination section. An ordinary photocurrent output from the photocurrent detection section prior to projection of the beam is digitally converted by a set/clear section of each bit of a digital value. The converted value is stored in a memory section. In projection of the beam, the ordinary photocurrent corresponding to the output from the memory section is extracted from the photocurrent output from the photocurrent detection section by an ordinary photocurrent extraction section without using a hold capacitor. In the second aspect, light is repeatedly projected from a projecting section on an object, and light reflected by the object is repeatedly received by a light-receiving section. After an object distance is calculated by an analog distance measurement arithmetic section in the light-receiving section, it is A/D-converted into digital data. This digital data representing the object distance is digitally accumulated in an adder section, thereby obtaining an object distance from a plurality of distance measurement arithmetic values without using an integral capacitor.

24 Claims, 23 Drawing Sheets

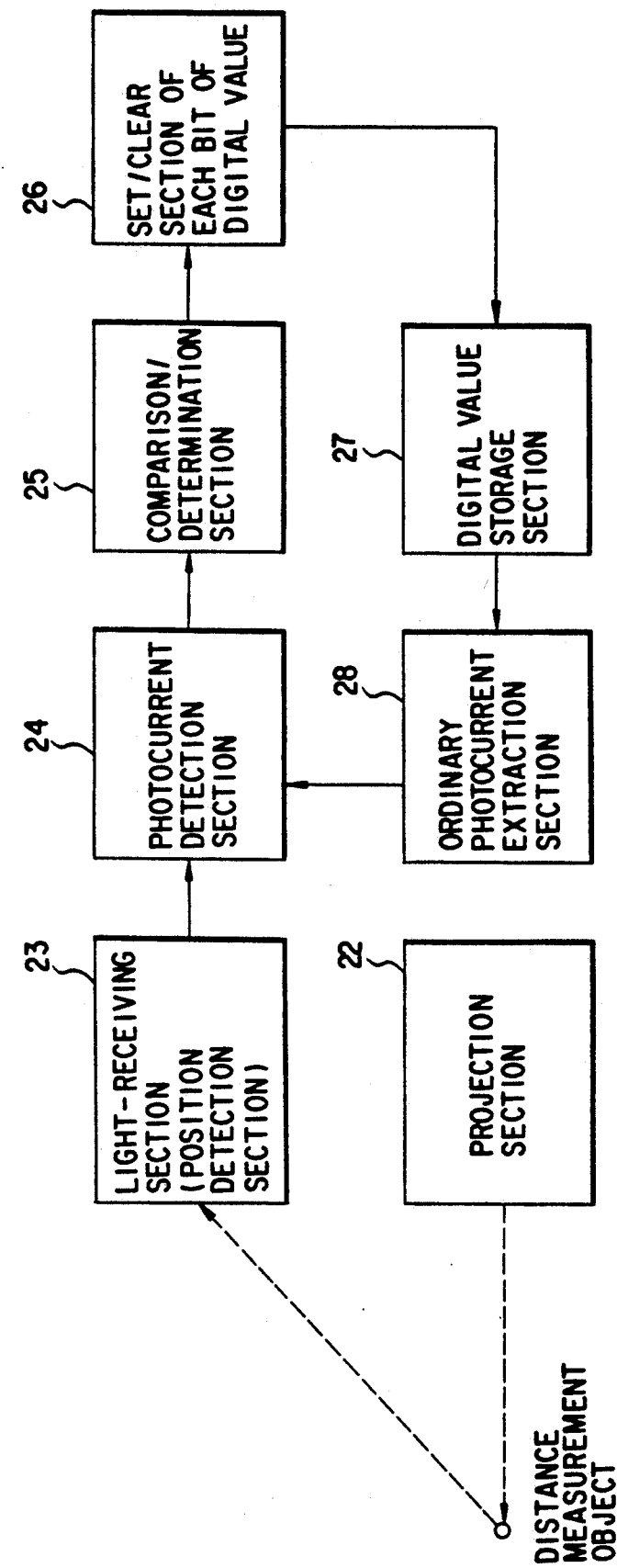
F I G. 1

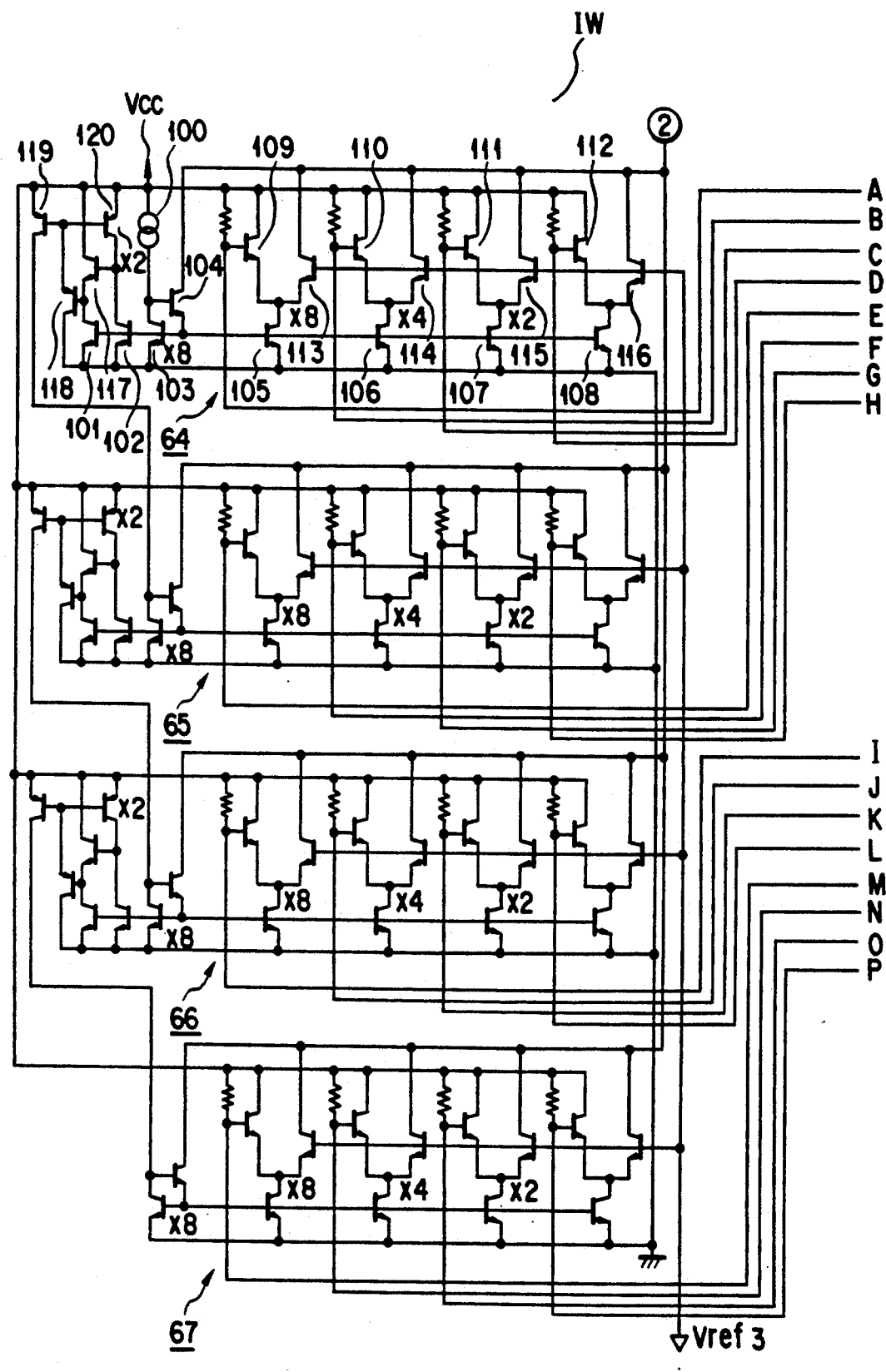
F I G. 3

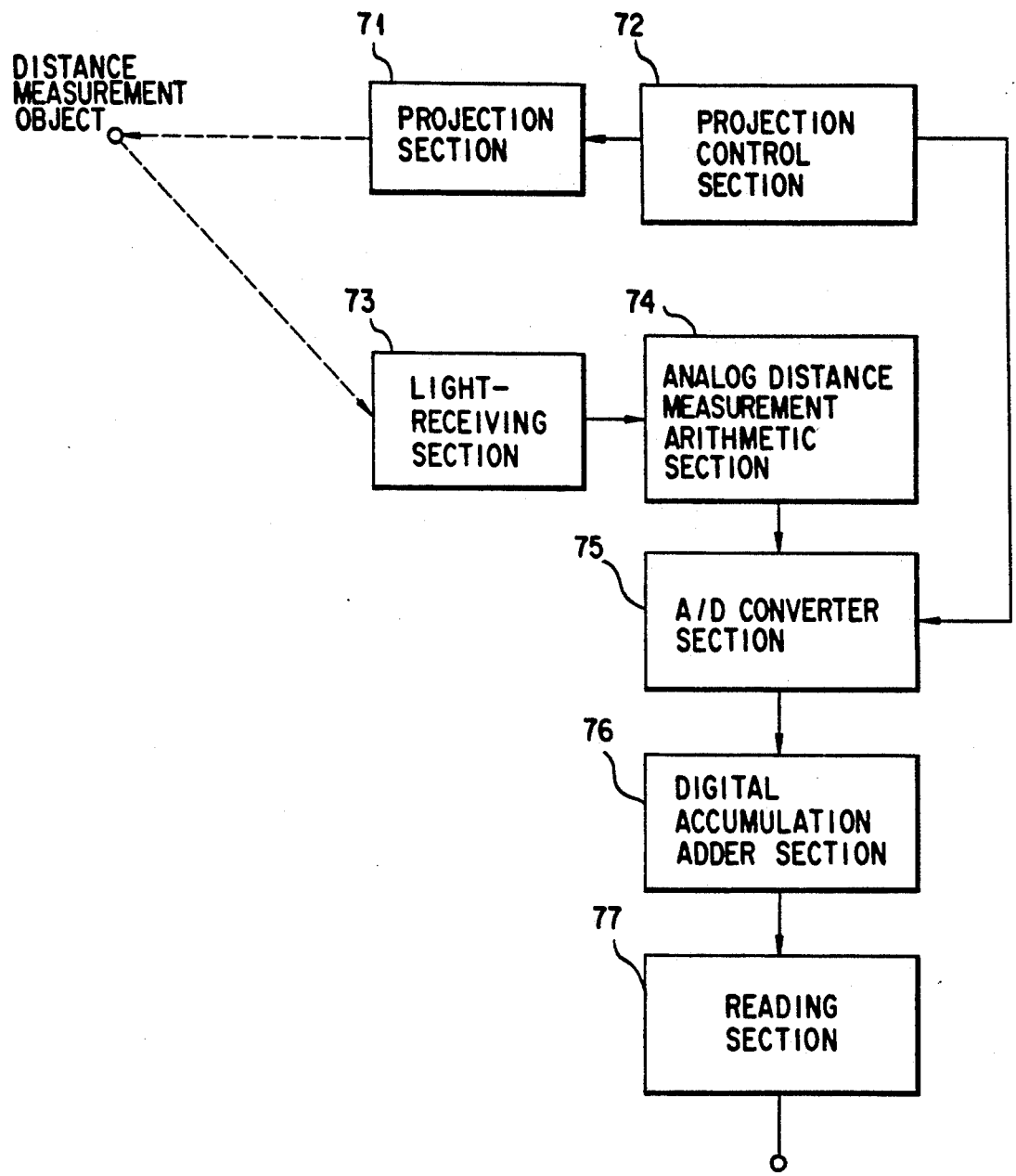
F I G. 9

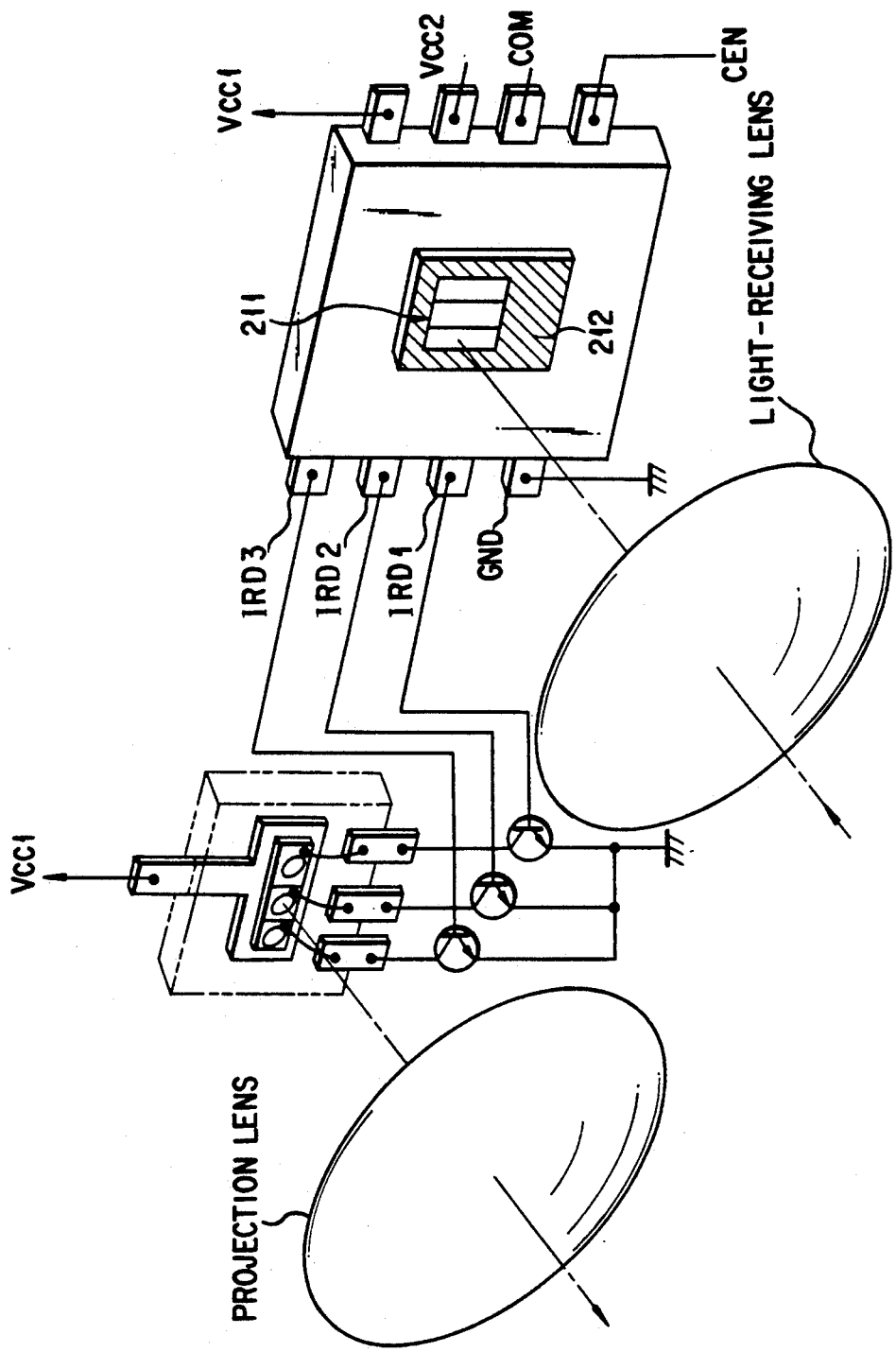
F I G. 10

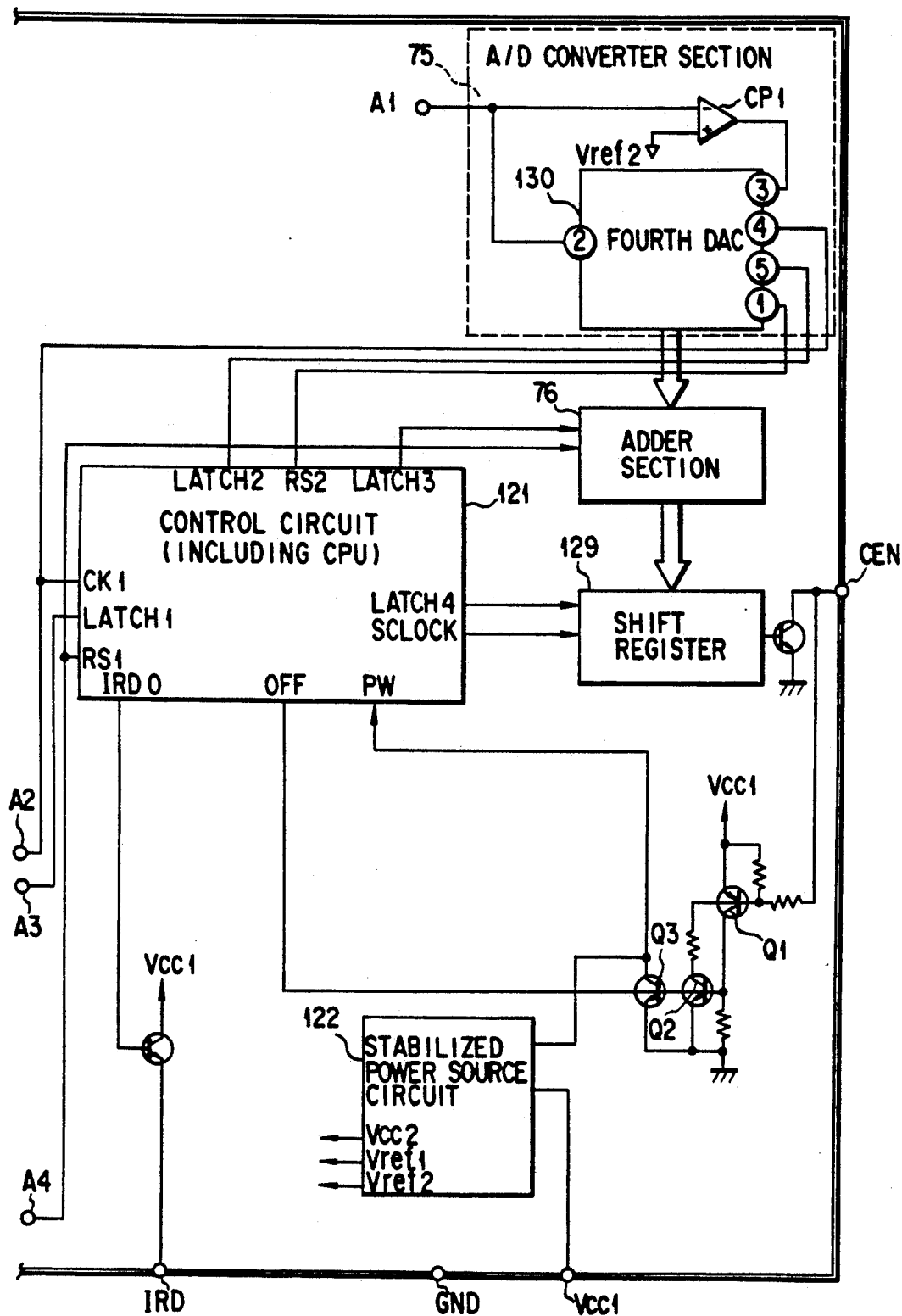
F I G. 13

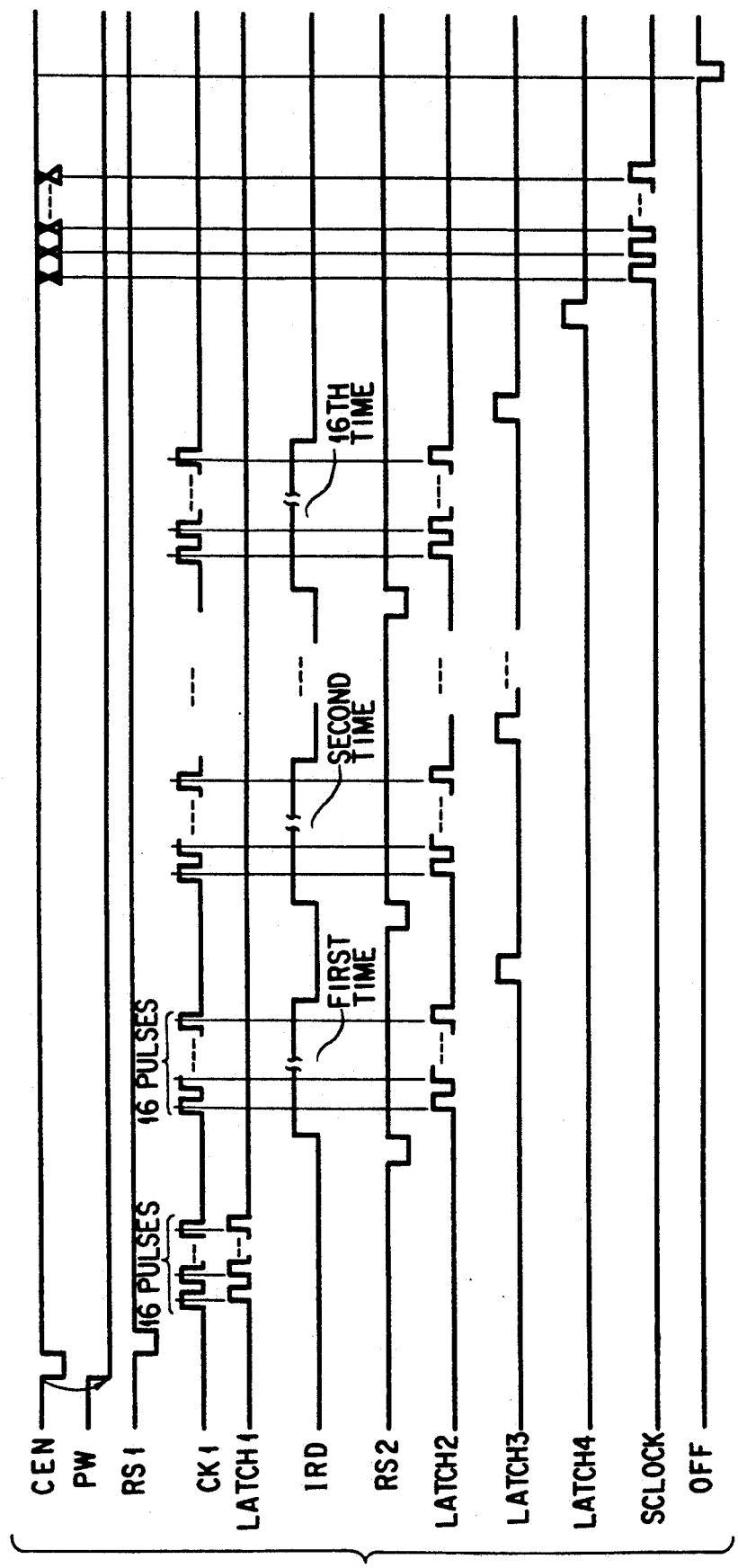
F I G. 16

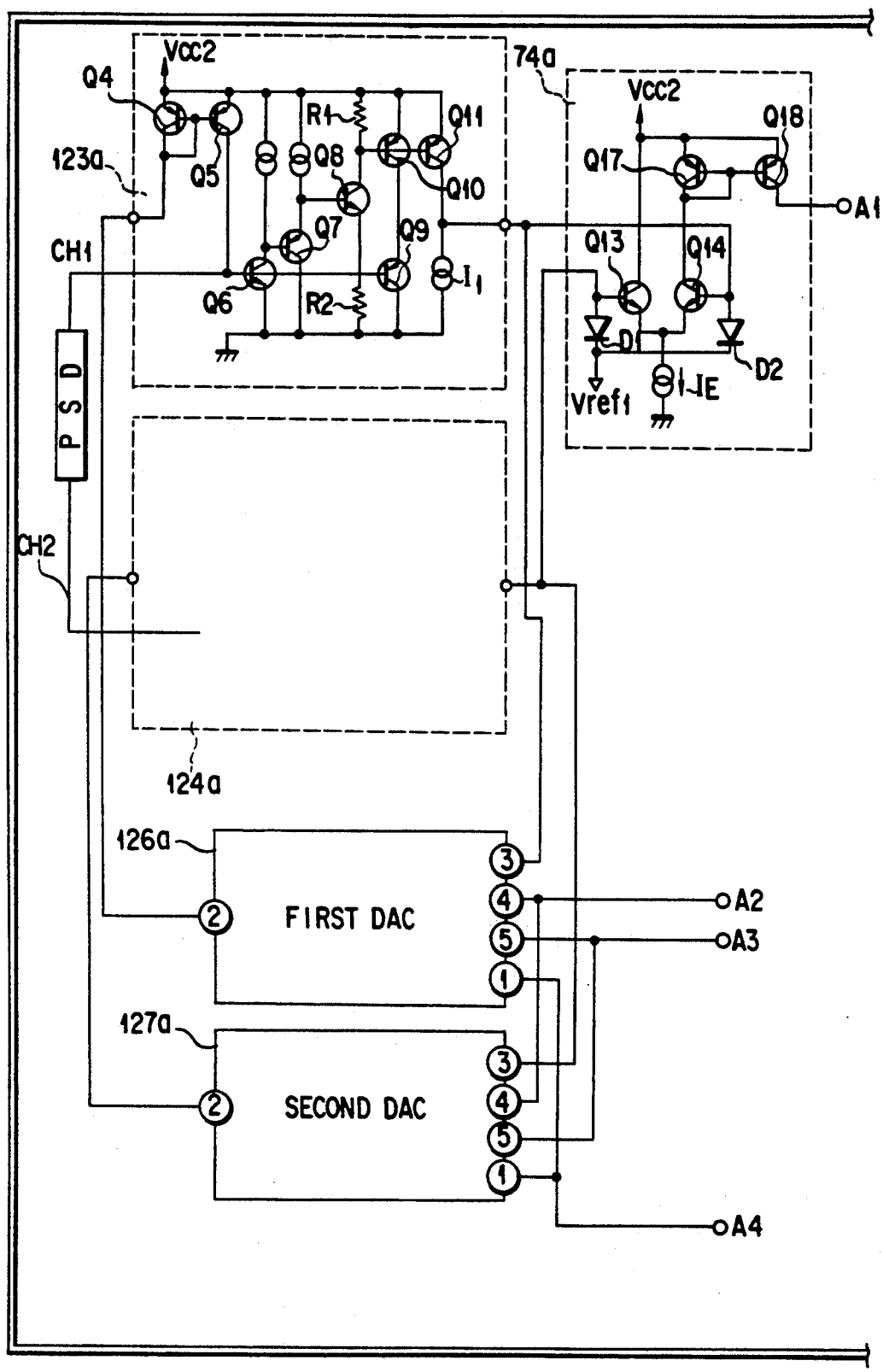
F I G. 18

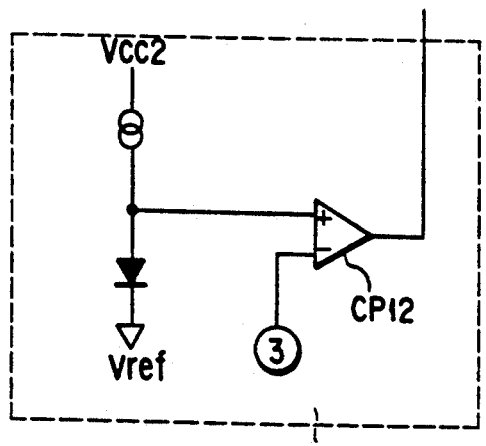
F I G. 22

DIGITALLY ACTIVE DISTANCE MEASUREMENT APPARATUS FOR CAMERA OR THE LIKE

BACKGROUND OF THE INVENTION

1. Field of the Invention

The present invention generally relates to a distance measurement apparatus and, more particularly, to an active distance measurement apparatus applied in distance detection used in an apparatus (e.g., a camera) requiring distance measurement.

2. Description of the Related Art

FIG. 23 is an example of a conventional active distance measurement apparatus using a PSD (optical position sensing device) 5. In this distance measurement apparatus, pulsed light from a light source 2 such as an IRED (infrared-emitting diode) is projected on an object 1 serving as a distance measurement target, and the position of an incident spot formed on the PSD 5 by pulsed light from the light source 2 upon reflection on the object 1 is detected to measure an object distance.

Referring to FIG. 23, an infrared-ray projected from the light source or IRED 2 through a projection lens 3 is reflected by the object 1 and is incident on the PSD 5 through light-receiving lens 4. An incident position x of the infrared-ray is defined by the following equation (1) when an intersection between the optical axis of the light-receiving lens 4 and the PSD 5 is defined as an origin.

$$x = \frac{S \cdot f}{l} \quad (1)$$

where S is the distance between the projection lens 3 and the light-receiving lens 4, l is the distance between the projection lens 3 and the object 1, and f is the distance between the light-receiving lens 4 and the PSD 5.

The PSD 5 generates a signal photocurrent $i_p$ and outputs signal currents $i_A$ and $i_B$ depending on the incident position x from two output terminals 5A and 5B in accordance with its operational principle. The signal current $i_A$ is defined as follows:

$$i_A = \frac{a + x}{t} \cdot i_P \quad (2)$$

where a is the distance from the PSD end of the IRED 2 side to the origin, and t is the length of the PSD 5.

Equation (4) is derived from equation (3) as follows:

$$i_A + i_B = i_P \quad (3)$$

$$\frac{i_A}{i_A + i_B} = \left(a + \frac{S \cdot f}{l}\right) \cdot \frac{1}{t} \quad (4)$$

Therefore, a ratio $i_A/(i_A+i_B)$ based on equation 4 is calculated to obtain the distance l.

In addition to the pulsed light from the light source 2, external light is also incident on the PSD 5. A photocurrent component produced by the reflected light of the pulsed light is superposed on an ordinary photocurrent produced by the external light. A detection circuit connected to the output of the PSD 5 must have a function of separating and extracting only the photocurrent component produced by the reflected light of the pulsed light.

This ordinary light extraction method is disclosed in Published Unexamined Japanese Patent Application No. 1-240812, and an ordinary photocurrent extraction technique can be derived therefrom.

The ordinary photocurrent extraction technique and an output depending on the distance l in use of the detection circuit shown in FIG. 23 will be described below.

The output current i ($i_A$) from the PSD 5 is amplified by a preamplifier 7A and an amplifying transistor 8A through an input terminal 6A. The amplifying transistor 8A is connected to a current source 9A, a current source 10A, a compression diode 11A, and a buffer 12A. The inverting input terminal (−) of a hold amplifier 13A is connected to the amplifying transistor 8A, the noninverting input terminal (+) of the hold amplifier 13A is connected to a compression diode 14A and a current source 15A, and the output terminal of the hold amplifier 13A is connected to a hold transistor 16A, a hold resistor 17A, and a hold capacitor 18A, as shown in FIG. 23.

A differential pair of transistors 21 and 22 constituting a ratio calculating circuit 20 together with a current source 19 receive an output from the compression diode 11A through the buffer 12A. The compression diodes 11A and 14A have same characteristics, and the current sources 9A and 15A are set at the same current level. An output voltage of the hold amplifier 13A is determined such that output voltages of the compression diodes 11A and 14A, i.e., voltages input to the inverting and noninverting input terminals of the hold amplifier 13A are set equal to each other.

In the detection circuit shown in FIG. 23, constituting elements represented by reference numerals 6B to 18B are identical to those represented by reference numerals 6A to 18A and are arranged in the same manner as those of the elements represented by reference numerals 6A to 18A. The suffix A is replaced with B, and a detailed description of the arrangements and operations of these elements will be omitted.

The operation of the detection circuit having the above arrangement will be described below.

An ordinary light storage operation for storing an ordinary photocurrent component is performed. Referring to FIG. 23, the hold amplifier 13A and the current source 10A are turned on in response to a hold signal $T_1$, and all the circuits except for the IRED 2 and the ratio calculating circuit 20 start to operate. In this state, the output current i of the PSD 5 is equal to an ordinary photocurrent $I_p$, and the hold amplifier 13A operates to store it in the hold capacitor 18A.

When the ordinary photocurrent $I_p$ is amplified by the preamplifier 7A, the output voltage of the compression diode 11A is decreased by this current, and the potential at the inverting input terminal of the hold amplifier 13A is also decreased. The output voltage of the hold amplifier 13A is increased, and the base potential at the hold transistor 16A is increased accordingly. The ordinary photocurrent $I_p$ is grounded as a collector current through the hold resistor 17A. That is, the ordinary photocurrent $I_p$ is always grounded by a feedback operation without being amplified.

The bias current of the amplifying transistor 8A is supplied from the current source 9A. During non-emission of the IRED 2, no current flows to points A and B in FIG. 23. This ordinary light storage operation continues for a predetermined period of time in accordance with the hold signal $T_1$, and the charge corresponding to the ordinary light component is stored and held in the hold capacitor 18A. The ordinary light storage operation time is called a stable time.

When the IRED 2 emits light in accordance with an emission signal T2, the function of the hold amplifier 13A is interrupted by the hold signal T1. At this time, the ordinary light extraction charge is held in the hold capacitor 18A. While the ordinary photocurrent $I_p$ is being extracted, the signal current i is amplified by the preamplifier 7A and the amplifying transistor 8A, and a signal current flows through the compression diode 11A. During emission of the IRED 2, the current source 10A is turned off in response to the hold signal T1.

An output voltage V of the compression diode 11A is defined by the following equation:

$$V = V_T \ln \frac{K \cdot i}{I_S} \quad (5)$$

where
- $V_T$: thermal voltage
- $I_S$: reverse saturation current
- K: gains of the preamplifier 7A and amplifying transistor 8A
- ln: Napierian logarithm As described above, the output current from the PSD 5 is a voltage compressed by the compression diode. The ratio calculating circuit 20 for obtaining the ratio $i_A/(i_A+i_B)$ using this compressed signal will be described below.

Currents $I_{out}$ and $I_z$, and voltages $V_A$ and $V_B$ in FIG. 23 are represented by equations (6) and (7) below.

$$I_{out} + I_z = I_o \quad (6)$$

$$V_A - V_B = V_T \ln \frac{i_A}{I_S} - V_T \ln \frac{i_B}{I_S} \quad (7)$$

$$= V_T \ln \frac{I_{out}}{I_S} - V_T \ln \frac{I_z}{I_S}$$

therefore, equation (8) is established as follows:

$$\frac{i_A}{i_B} = \frac{I_{out}}{I_z} \quad (8)$$

since $I_z = I_o - I_{out}$ from equation (6), equations (9), (10), and (11) are obtained as follows:

$$\frac{i_A}{i_B} = \frac{I_{out}}{I_o - I_{out}} \quad (9)$$

$$i_B \cdot I_{out} = i_A \cdot (I_o - I_{out}) \quad (10)$$

$$I_{out} = \frac{i_A}{i_A + i_B} \cdot I_o \quad (11)$$

A substitution of equation (4) into equation (11) yields equation (12) below:

$$I_{out}/I_o = \left(a + \frac{S \cdot f}{l}\right) \cdot \frac{1}{t} \quad (12)$$

As described above, the distance measurement arithmetic output depending on the distance l can be obtained.

As described above, the conventional ordinary light extraction circuit requires the hold capacitor 18A.

First, when this hold capacitor is used, however, the charge voltage leaks over time. For example, when a relatively long period of time is required to perform distance measurement a plurality of number of times upon holding of the ordinary photocurrent component, the extraction current is gradually decreased to result in a distance measurement error. This typically occurs in a bright place with external light.

Second, the capacitor itself has a hold error due to its dielectric absorption. An error current $\Delta_{IP}$ is also superposed by the dielectric absorption, and the distance measurement precision is adversely affected.

Third, at present, a tantalum capacitor having a capacitance of about 0.47 μF to 1 μF is used as a hold capacitor in view of hold characteristics. The tantalum capacitor is large in size and expensive when its application to the field of cameras is taken into consideration.

In addition, since the tantalum capacitor is externally attached to an IC chip, extra pins must be arranged in this IC, posing problems on cost and space factor.

The distance measurement arithmetic output thus obtained is represented by a single characteristic line L1 proportional to the reciprocal of the object distance, as shown in FIG. 24. However, the signal light as a photocurrent from the object is normally as very weak as about several 10 pA when the object is remote from the camera, an uncertainty region No represented by a hatched region and surrounded by curves L2 and L3 shown in FIG. 25 is formed due to shot noise of the photocurrent detection circuit and the photocurrent itself, and noise of the sensor itself.

One of the effective means for reducing the uncertainty region No and improving the distance measurement precision is a technique for causing an integral capacitor to store distance measurement arithmetic output currents obtained by the measurement performed a plurality of number of times (n times), as disclosed in each of Published Unexamined Japanese Patent Application No. 1-224617, GB 2212688, and U.S. Pat. No. 5,136,148. This technique is known as a means for extracting a weak signal mixed with noise with a high S/N ratio. According to this means, the uncertainty can be reduced to $1/\sqrt{n}$.

The above means is implemented for so-called signal processing applicable to all active distance measurement apparatuses and is very useful to improve distance measurement precision. However, this means has the following four problems.

<1> An external capacitor attached to a chip is required to perform accumulation processing.

<2> IC pins for externally attaching the capacitor to a distance measurement IC are required, the distance measurement IC package becomes large in size, and the compactness of the camera is impaired.

<3> Processing circuits such as a circuit for charging/discharging the capacitor and a circuit for resetting the capacitor are required to result in a bulky distance measurement IC circuit.

<4> The external accumulation capacitor must be selected as a capacitor having a small leakage current and small dielectric absorption in the same manner as the hold capacitor. A capacitor which satisfies these requirements is expensive and larger in outer appearance than the normal ceramic capacitor by almost twofold, thus posing mounting problems. An influence of the dielectric absorption on distance measurement will be described below.

FIG. 26 is an equivalent circuit diagram of this type of external capacitor. When a voltage $V_{ref}$ is applied to a capacitor C represented in this equivalent circuit through a switch SW, as shown in FIG. 27A, a terminal voltage in the switch-OFF operation is lower by $\Delta V$ caused by the dielectric absorption than that in the switch-ON operation, as shown in FIG. 27B.

Assume that three distance measurement operations are performed within a short period of time after the distance measurement IC is powered on. In the first distance measurement operation, when the distance measurement IC is powered on, the integral capacitor is charged to the voltage $V_{ref}$. In this case, the voltage $V_{ref}$ is selected to be a small voltage of about 0.2V so as to minimize the influence of the dielectric absorption. However, in the initial period, as shown in FIG. 27B, the voltage is decreased by $\Delta V$, i.e., several mV, due to the influence of the dielectric absorption. In addition, since the integral capacitor is also susceptible to the influence of dielectric absorption during integration, the charge is absorbed by a capacitor Cs shown in FIG. 26, thereby slightly decreasing the integral voltage.

From the second distance measurement operation, the amount of charge absorbed by the capacitor Cs is reduced, and the distance measurement value in the first distance measurement operation is smaller than that of each of the second and third distance measurement operations by about 10%. In addition, since the dielectric absorption characteristics nonlinearly vary depending on temperatures, it is difficult to propose an effective correcting means.

SUMMARY OF THE INVENTION

It is, therefore, an object of the present invention to provide a new and improved distance measurement apparatus in which an ordinary light extraction section is constituted by a digital arrangement to eliminate a hold capacitor, a distance measurement error, an adverse influence on distance measurement precision, and problems on cost and space factor.

It is another object of the present invention to provide a distance measurement apparatus in which the conventional problems described above are solved by constituting a distance measurement arithmetic output accumulation adder section by a digital arrangement, so that an integral capacitor for accumulating distance measurement values obtained by distance measurement by a plurality of number of times in an active trigonometric distance measurement scheme can be omitted.

It is still another object of the present invention to provide a distance measurement apparatus in which both the ordinary light extraction section and the distance measurement arithmetic output accumulation adder section are constituted by digital arrangements to maximally improve distance measurement precision and cost performance.

According to a first aspect of the present invention, there is provided a distance measurement apparatus for a camera, comprising:

an infrared-emitting diode for projecting an infrared-ray on a distance measurement object a plurality of number of times;

an optical position detection element for receiving light reflected by the distance measurement object upon incidence of the infrared-ray thereon and outputting a photocurrent corresponding to an irradiated position of the light and an ordinary photocurrent;

a first A/D converter for detecting the ordinary photocurrent of the optical position detection element prior to projection operations performed by the infrared-emitting diode the plurality of number of times, and converting a detected ordinary photocurrent into a digital signal;

a first digital memory circuit for storing the digital signal converted by the first A/D converter;

a current extraction circuit for setting a current having a value corresponding to a storage value of the first digital memory circuit in the projection operations, and extracting a set current from the photocurrents outputting by the optical position detection element;

an analog arithmetic circuit for outputting an analog distance signal corresponding to a distance to the distance measurement object, using an output current of the optical position detection element from which the set current corresponding to the ordinary photocurrent is extracted by the current extraction circuit;

a second A/D converter for converting the analog distance signal into a digital distance signal;

a second digital memory circuit in which latest outputs from the second A/D converter are sequentially added and accumulated every time the projection operation is performed; and a processing circuit for performing digital processing corresponding to arithmetic averaging of data accumulated in the second digital memory circuit upon completion of the projection operations performed the plurality of number of times.

According to a second aspect of the present invention, there is provided a distance measurement apparatus comprising:

projecting means for projecting a beam toward an object;

light-receiving means for receiving light reflected by the object upon incidence of the beam thereon and outputting a photocurrent signal containing an ordinary photocurrent component;

analog-to-digital converting means for performing analog-to-digital conversion of the photocurrent signal as the ordinary photocurrent component output by the light-receiving means during non-projection of the projecting means;

memory means for storing a digital value of the ordinary photocurrent component converted by the digital-to-analog converting means;

current extracting means for extracting the ordinary photocurrent component from the photocurrent signal output by the light-receiving means during projection of the projecting means on the basis of the digital value stored in the memory means; and arithmetic means for calculating a distance to the object using an output current from the light-receiving means from which the ordinary photocurrent component is extracted by the current extracting means.

According to a third aspect of the present invention, there is provided a distance measurement apparatus for a camera, comprising:

an infrared-emitting diode for projecting an infrared-ray on a distance measurement object;

an optical position detection element for receiving light reflected by the distance measurement object upon incidence of the infrared-ray thereon and outputting a photocurrent corresponding to an irradiated position;

an analog arithmetic circuit for outputting an analog distance signal corresponding to a distance to the distance measurement object, using an output from the optical position detection element;

an A/D converter for converting the analog distance signal into a digital distance signal;

a control circuit for operating the infrared-emitting diode, the optical position detection element, and the analog arithmetic circuit so as to perform distance measurement operations a plurality of number of times;

a memory circuit in which latest outputs from the A/D converter are sequentially added and accumulated whenever each of the distance measurement operations performed the plurality of number of times is performed; and a processing circuit for performing digital processing corresponding to arithmetic averaging of data accumulated in the memory circuit upon completion of the distance measurement operations performed the plurality of number of times.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram showing the principle of a distance measurement apparatus according to the first embodiment of the present invention;

FIG. 3 is a circuit diagram showing part of an ordinary photocurrent extraction circuit in FIG. 2;

FIG. 9 is a block diagram of a distance measurement apparatus according to the second embodiment of the present invention;

FIG. 10 is a perspective view of the distance measurement apparatus according to the second embodiment of the present invention;

FIG. 13 is a circuit diagram of an A/D converter section in the internal equivalent circuit of the distance measurement IC according to the second embodiment of the present invention;

FIG. 16 is a timing chart of a distance measurement operation of the second embodiment;

FIG. 18 is a circuit diagram of a light-receiving section and an analog distance measurement arithmetic section according to the third embodiment of the present invention;

FIG. 22 is a circuit diagram showing a comparator and its peripheral part included in the logic section in the background light canceler section according to the third embodiment;

DETAILED DESCRIPTION OF THE PREFERRED EMBODIMENTS

Figure 2:
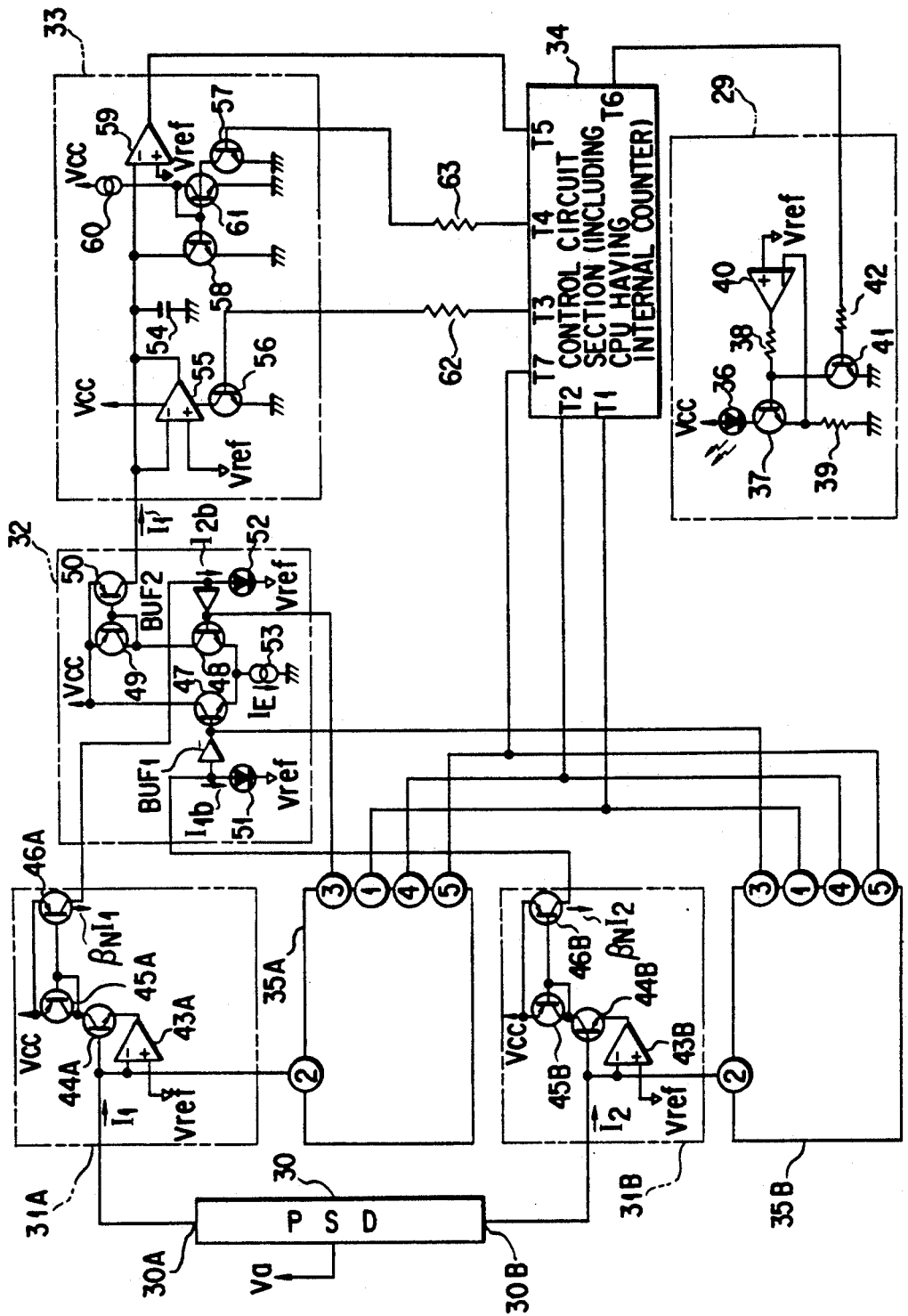
FIG. 2 is a circuit diagram showing the detailed arrangement of the distance measurement apparatus of the first embodiment.

Reference will now be made in detail to the presently preferred embodiments of the invention as illustrated in the accompanying drawings, in which like reference characters designate like or corresponding parts throughout the several drawings.

FIG. 1 is a block diagram showing the principle of a distance measurement apparatus according to the first embodiment of the present invention. A projection section 22 projects light toward a distance measurement object. Light reflected by the distance measurement object and received by a light-receiving section 23 is detected by a photocurrent detection section 24. The detected photocurrent is supplied to a comparison/determination section 25. A set/clear section 26 for each bit of a digital value sets or clears each bit of the digital value on the basis of an output from the comparison/determination section 25. An output from the set/clear section 26 is supplied to a digital value storage section 27. An ordinary photocurrent extraction section 28 extracts ordinary light from the photocurrent detection section 24 in accordance with the value from the digital value storage section 27.

In this arrangement, when the light reflected by the distance measurement object is received by the light-receiving section 23, the output from the light-receiving section 23 is detected by the photocurrent detection section 24. This detection output is compared with a predetermined level in the comparison/determination section 25 and is determined. The set/clear section 26 for each bit of the digital value sets or clears each bit of the digital value from the digital value storage section 27 on the basis of the output result from the comparison/determination section 25. The ordinary photocurrent extraction section 28 extracts, from the photocurrent detection section 24, the ordinary photocurrent corresponding to the output stored in the digital value storage section 27.

The comparison and determination operations of all bits of the digital value are performed for every bit to determine the digital value, thereby extracting the ordinary photocurrent.

FIG. 2 is a circuit diagram showing the detailed arrangement of the distance measurement apparatus of the first embodiment according to the present invention.

Figure 4:
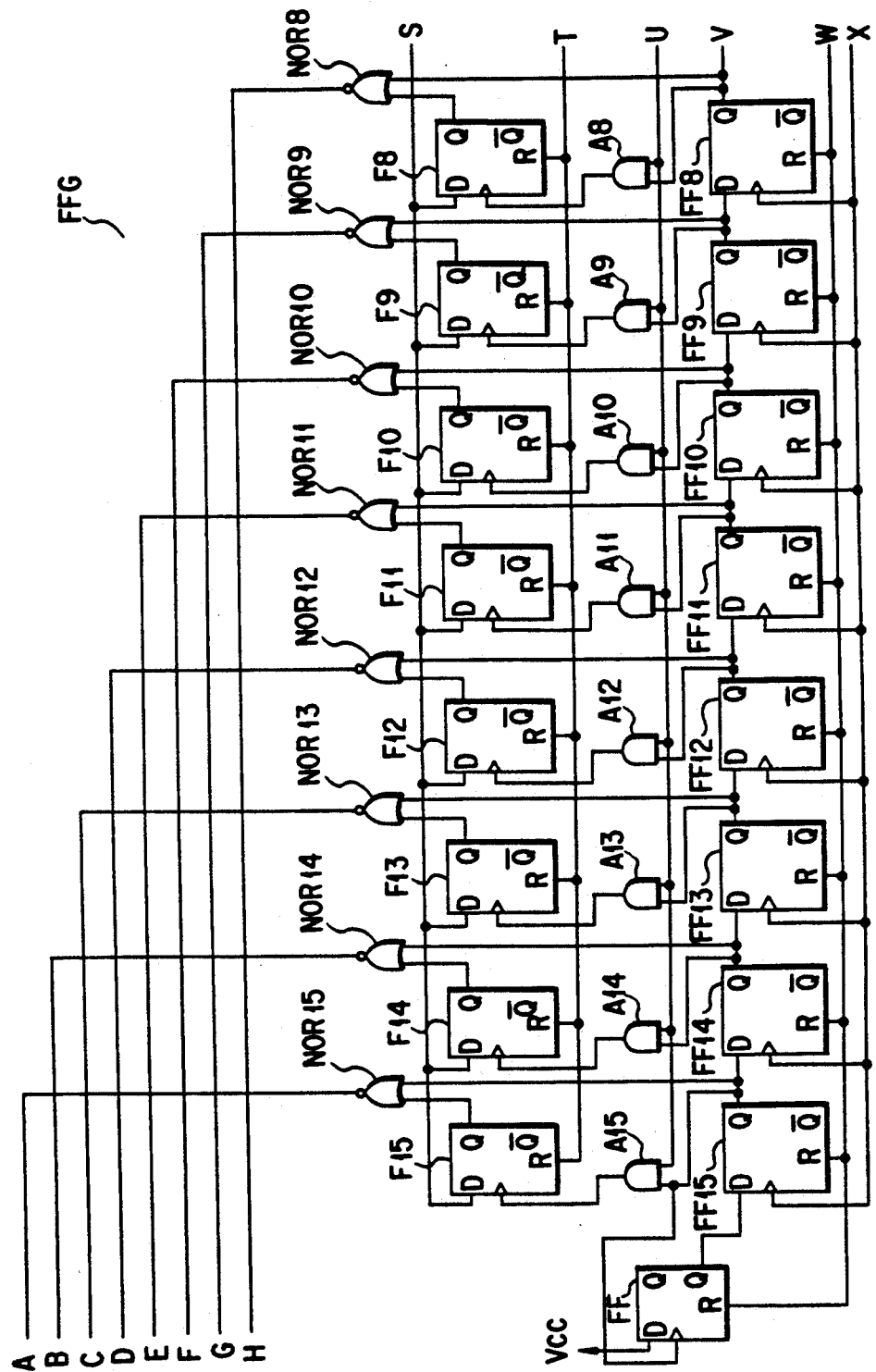
FIG. 4 is a circuit diagram showing part of the ordinary photocurrent extraction circuit in FIG. 2.
Figure 5:
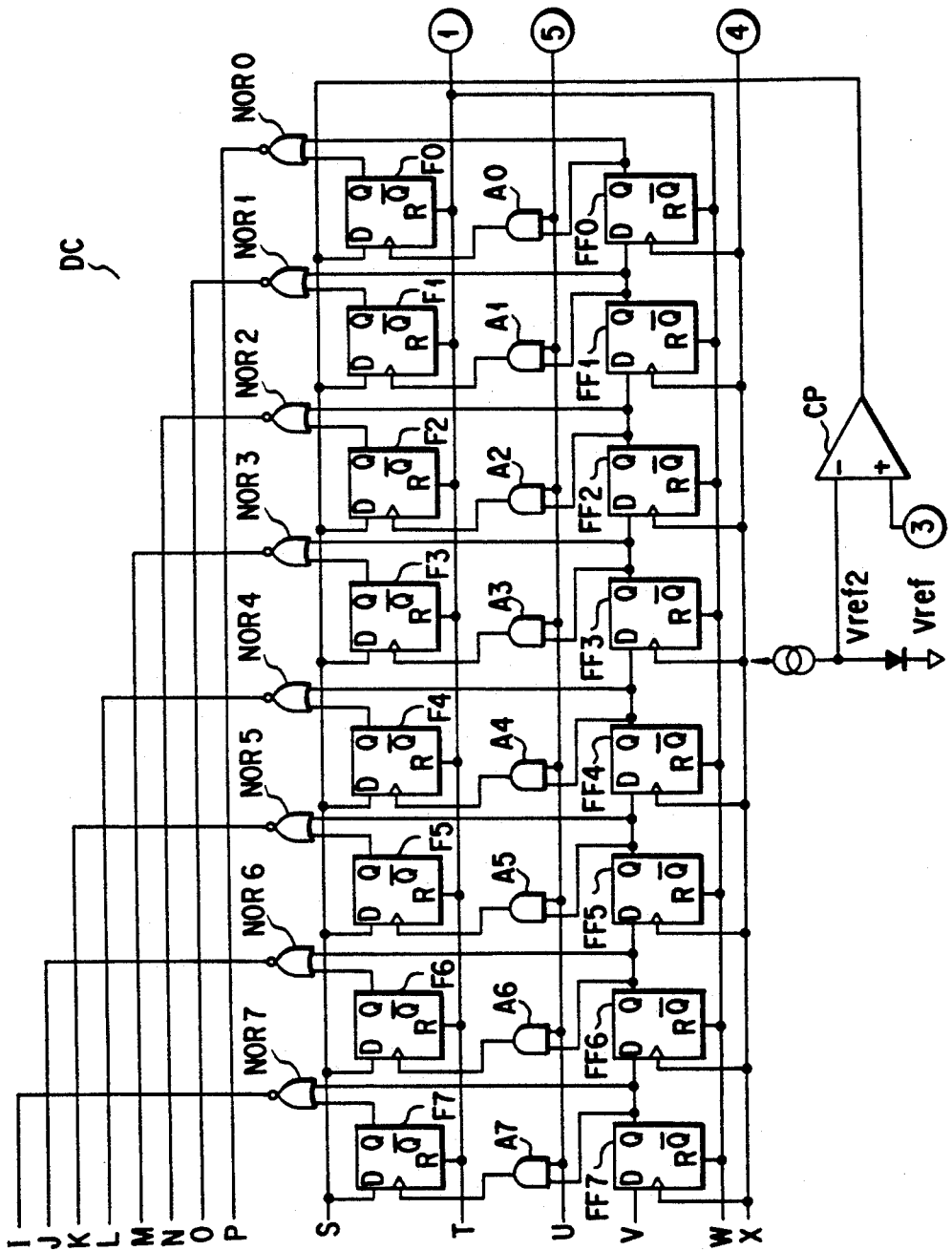
FIG. 5 is a circuit diagram showing part of the ordinary photocurrent extraction circuit in FIG. 2.

As shown in FIG. 2, this distance measurement apparatus comprises a projection circuit 29 for projecting a light pulse to the distance measurement object, photocurrent detection circuits 31A and 31B for causing a PSD 30 to receive light reflected by the distance measurement object, thereby detecting a photocurrent component of the signal pulses and amplifying the photocurrent component, an arithmetic output circuit 32 for obtaining distance information of the object from the photocurrent superposed on the bias current, a count circuit 33 for A/D-converting an output from the arithmetic output circuit 32, a control circuit 34, including a CPU incorporating a counter, for sending control signals to the projection circuit 29, the photocurrent detection circuits 31A and 31B, the arithmetic output circuit 32, and the count circuit 33, and ordinary photocurrent extraction circuits 35A and 35B (details are shown in FIGS. 3, 4, and 5).

Since the photocurrent detection circuits 31A and 31B are identical and the ordinary photocurrent extraction circuits 35A and 35B are also identical, only the photocurrent detection circuit 31A and the ordinary photocurrent extraction circuit 35A will be described. The suffix A is replaced with B for the photocurrent detection circuit 31B and the ordinary photocurrent extraction circuit 35B, and a detailed description thereof will be omitted. This applies to all identical components throughout the drawings.

Referring to FIG. 2, an IRED 36 in the projection circuit 29 is driven at a constant current by a constant current driver constituted by a transistor 37, resistors 38 and 39, and an operational amplifier 40. The base of a transistor 41 which ON/OFF-controls this constant current driver is connected to a terminal $T_6$ of the control circuit 34 through a resistor 42. The ON/OFF control of the infrared-ray projected from the IRED 36 in the pulse waveform shown in FIG. 7 (to be described later) is performed by an output signal (FIG. 7) from the terminal $T_6$ of the control circuit 34.

The photocurrent detection circuit 31A comprises a preamplifier circuit constituted by an operational amplifier 43A and a transistor 44A, and a current mirror circuit constituted by transistors 45A and 46A. A signal pulse photocurrent $I_1$ obtained from an anode 30A of the PSD 30 is supplied to the operational amplifier 43A constituting the preamplifier circuit. The output terminal of the operational amplifier 43A is connected to the emitter of the transistor 44A, and the noninverting input terminal (+) of the operational amplifier 43A is connected to the reference voltage $V_{ref}$, so that the operational amplifier 43A is fed back by the transistor 44A. Therefore, the base input resistance of the transistor 44A is equivalently decreased to several tens of kΩ.

As shown in FIGS. 3 to 5, the ordinary photocurrent extraction circuit 35A comprises a current weighting circuit IW, a flip-flop group FFG for ON/OFF-controlling the weighting coefficients in correspondence therewith, a comparator CP, and a digital circuit DC for ON/OFF-controlling outputs from the flip-flop group FFG on the basis of the output from the comparator CP.

The current weighting circuit IW in FIG. 3 will be described below. The current weighting circuit IW comprises four circuits 64, 65, 66, and 67. Since the circuits 64, 65, 66, and 67 are identical to each other, only the circuit 64 will be described for the sake of descriptive convenience, and a detailed description of the circuits 65, 66, and 67 will be omitted.

A current source 100 is a current source for outputting a constant current of 5 μA. In a current mirror circuit constituted by transistors 103 to 108, a collector current of 5 μA flows in the transistor 105, a collector current of $5/2^2$ μA flows in the transistor 106, a collector current of $5/2^2$ μA flows in the transistor 107, and a collector current of $5/2^3$ μA flows in the transistor 108. These collector currents are determined whether to be extracted as collector currents of transistors 113, 114, 115, and 116 in accordance with ON/OFF states of transistors 109, 110, 111, and 112.

Transistors marked with x2, x4, and x8 in FIG. 3 have emitter areas twice, four times, and eight times that of the transistor without any mark, the emitter area of which is defined as 1.

When the bases of the transistors 109 to 112 go to H (high level), the collector currents of the transistors 105 to 108 are respectively supplied to the transistors 109 to 112, and the collector currents of the transistors 113 to 116 are set zero. On the other hand, when the bases of the transistors 109 to 112 go to L (low level), the collector currents of the transistors 105 to 108 serve as the emitter currents of the transistors 113 to 116. Therefore, the collector currents flow through the transistors 113 to 116.

As described above, the currents flowing through the transistors 113 to 116 can be controlled by controlling the logic levels (H and L) of the bases of the transistors 109 to 112.

Transistors 101, 102, 117, 118, 119, and 120 constitute a pnp current mirror circuit. The collector current of the transistor 119 is reduced to $\frac{1}{2}$ (i.e., $5/2^4$ μA) the minimum unit current ($5/2^3$ μA) of the weighting circuit 64, and the current of $5/2^4$ μA is supplied to the next circuit, i.e., the weighting circuit 65.

The circuits (66 and 67) from the weighting circuit 65 have the same circuit arrangement, thereby extracting the weighting currents represented by relation 13:

$5\mu A/2^n$ ($n =$ integer from 0 to 15)     (13)

Before projection, the control circuit 34 outputs a clock signal from a terminal $T_1$. At this time, an ordinary current $I_{PO}\cdot\beta_N$ produced by external light amplified through the photocurrent detection circuit 31A flows from the anode 30A of the PSD 30 to a compression diode 52. In this case, the potential of the compression diode 52 is represented by relation 14 below:

$$V_{ref} + V_T \ln (I_{PO}\cdot\beta_N/I_S) \qquad (14)$$

where $V_T$: thermal voltage
$I_S$: reverse saturation current

This potential is transferred to a terminal ③ of the ordinary photocurrent extraction circuit 35A through a buffer circuit $BUF_2$ and is compared with a reference voltage $V_{ref2}$ by the comparator CP in the ordinary photocurrent extraction circuit 35A, as shown in FIG. 5. The reference voltage $V_{ref2}$ is set slightly higher (about 0.4V) than the voltage $V_{ref}$.

Figure 6:
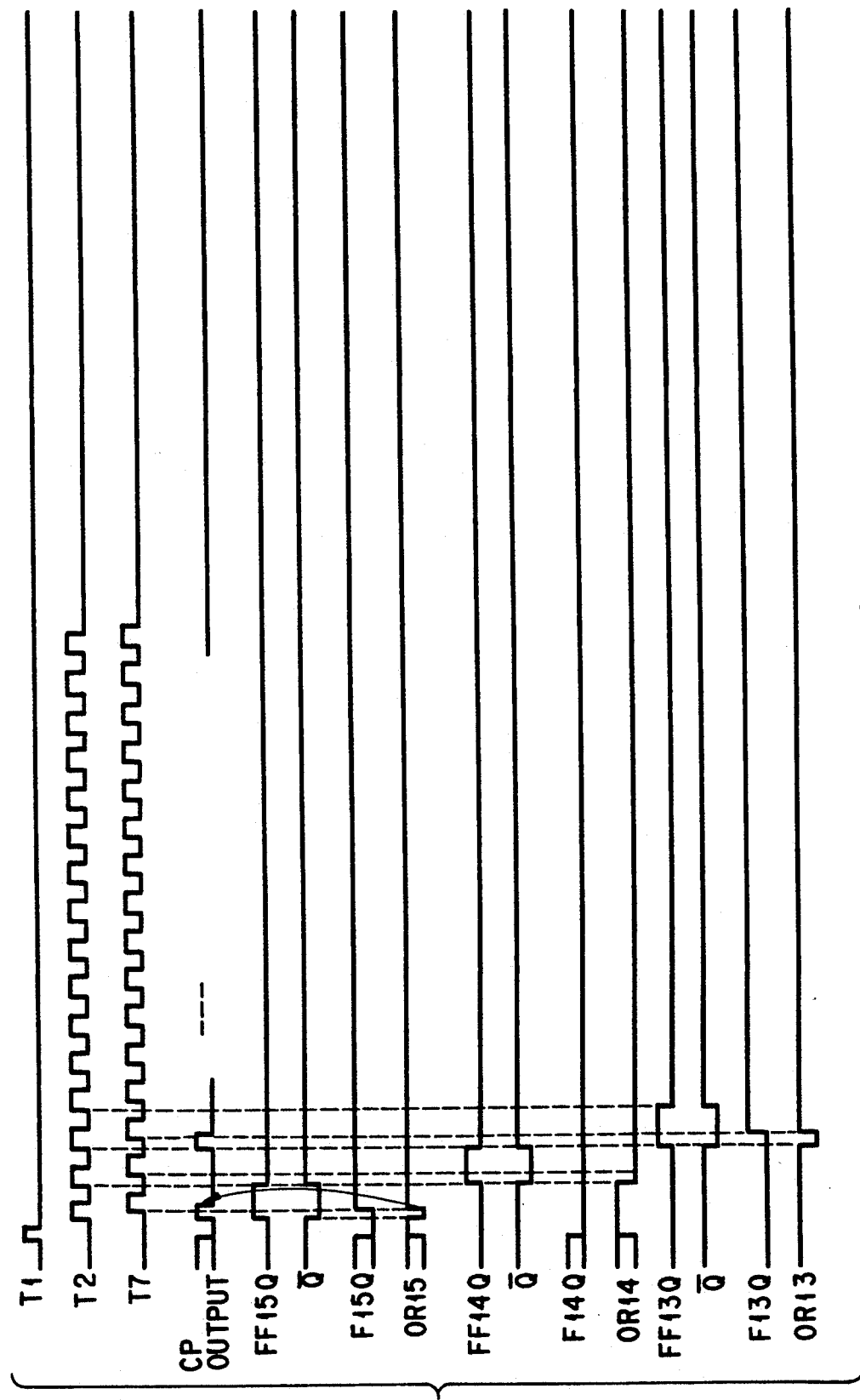
FIG. 6 is a timing chart of signals at the respective parts including signals supplied from a control circuit section in FIG. 2.
Figure 7:
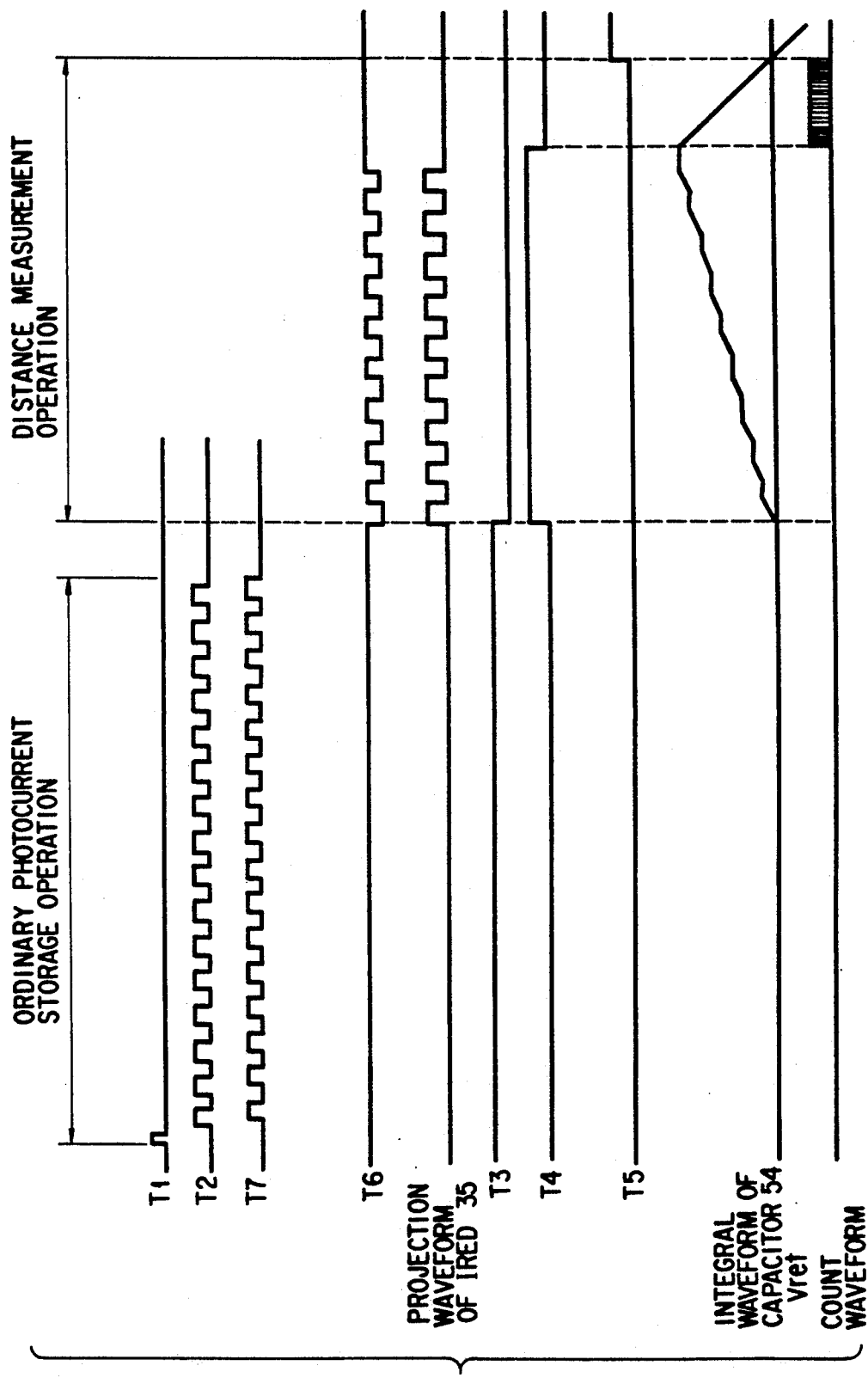
FIG. 7 is a timing chart of signals at the respective parts including signals supplied from the control circuit section in FIG. 2.

FIGS. 6 and 7 are timing charts of signals of the respective parts which include signals supplied from the terminal $T_1$ and terminals $T_2$ to $T_7$ of the control circuit 34. The operation will be described with reference to the timing charts in FIGS. 6 and 7.

The control circuit 34 outputs a reset pulse from the terminal $T_1$ to clear flip-flops FF, FF0 to FF15, and F0 to F15 in the ordinary photocurrent extraction circuit 35A. As a result, all the weights of the current weighting circuits are set OFF, and no current flows from the transistor 102 to GND (ground).

When one clock pulse is input from the terminal $T_2$, the Q output from the flip-flop FF15 goes to L, and an output from a NOR gate NOR15 goes to L accordingly.

The most significant bit of the current weighting circuit is set ON, and a current of 5 μm is discharged from the transistor 102 to GND. At this time, a current flowing in the compression diode 52 is given by:

$$(I_{PO} - 5\ \mu A)\cdot\beta_N \qquad (15)$$

In this case, the anode potential of the compression diode 52 is defined as follows:

$$V_{ref} + V_T \ln \{(I_{PO} - 5\ \mu A)\cdot\beta_N/I_S\} \qquad (16)$$

If $I_{PO} > 5\ \mu m$ and condition (17) is satisfied, an output from the comparator CP in the ordinary photocurrent extraction circuit 35A is set at H. Otherwise, the output from the comparator CP is set at L.

$$V_T \ln \{(I_{PO} - 5\ \mu A)\cdot\beta_N/I_S\} > 0.4V \qquad (17)$$

This output is latched and stored in the flip-flop FF15 in response to a clock output from the terminal $T_2$ of the control circuit 34. If $I_{PO} > 5\ \mu A$, then a current of 5 μm is discharged from a terminal ② to ground.

When one clock pulse is input from the terminal $T_2$, the Q output from the flip-flop FF14 goes to H, the output shown in equation (15) goes to L, and the output from an OR gate OR14 goes to L. The (most significant bit −1) bit of the current weighting circuit is turned on, and a current of 2.5 μm is discharged from the terminal ② to ground.

At this time, a current flowing in the compression diode 52 has relation (18) below:

$$(I_{PO} - 5\ \mu A\cdot F15Q - 2.5\ \mu A)\cdot\beta_N \qquad (18)$$

The anode potential of the compression diode 52 is given by relation (19) below:

$$V_{ref} + V_T \ln \{(I_{PO} - 5\ \mu A\cdot F15Q - 2.5\ \mu A)\cdot\beta_N/I_S\} \qquad (19)$$

The Q output from the flip-flop F15 is a value which depends on the H or L level of the previously stored Q output from the flip-flop F15. If the stored value is set at H, F15Q=1. However, if the stored value is set at L, F15Q=0.

If relation 20 is established, the output from the comparator CP in the ordinary photocurrent extraction circuit 35A is set at L. Otherwise, the output from the comparator CP is set at H.

$$V_T \ln \{(I_{PO} - 5\ \mu A\cdot F15Q - 2.5\ \mu A)\cdot\beta_N/I_S\} > 0.4V \qquad (20)$$

This output is latched and stored in the flip-flop FF15 in response to a clock output from the terminal $T_2$ of the control circuit 34. As a result, a current represented by relation (21) is discharged to GND.

$$5\mu A\cdot F15Q + 2.5\mu A\cdot F14Q \qquad (21)$$

A current represented by relation 22 is similarly discharged to GND:

$$5\ \mu A \cdot \{(2/2^0)\cdot F15Q + (1/2^1)\cdot F14Q + (1/2^2)\cdot F13Q + \qquad (22)$$
$$(1/2^3)\cdot F12Q + (1/2^4)\cdot F11Q + (1/2^5)\cdot F10Q + (1/2^6)\cdot F9Q +$$
$$(1/2^7)\cdot F8Q + (1/2^8)\cdot F7Q + (1/2^9)\cdot F6Q + (1/2^{10})\cdot F5Q +$$
$$(1/2^{11})\cdot F4Q + (1/2^{12})\cdot F3Q + (1/2^{13})\cdot F2Q +$$
$$(1/2^{14})\cdot F1Q + (1/2^{15})\cdot F0Q\}$$

In this manner, the ordinary light component can be discharged to a minimum unit represented by relation (23) below:

$$5\mu A/2^{15} \approx 153\ pA \qquad (23)$$

By employing the above ordinary photocurrent extraction arrangement, if a clock has, e.g., a frequency of 100 kHz, the ordinary photocurrent can be completely extracted at a high speed represented by equation (24) below. This arrangement is very effective to eliminate the time lag of the camera.

$$16\times(1/100\ kHz) = 160\ \mu sec. \qquad (24)$$

As described above, the pulse light component obtained such that a photocurrent produced by background light is removed from a photocurrent obtained from the anode 30A of the PSD 30 during projection is multiplied with $\beta_N$ by the transistor 44A in the photocurrent detection circuit 31A. The photocurrent component is then folded by the transistors 45A and 46A constituting the current mirror circuit and is injected as a signal pulse photocurrent $\beta_N\cdot I_1$ to the compression diode 52 of the arithmetic output circuit 32.

A photocurrent $I_2$ obtained from an anode 30B of the PSD 30 is also processed by the photocurrent detection circuit 31B operating in the same manner as in the photocurrent detection circuit 31A, and the ordinary photocurrent extraction circuit 35B. The processed photocurrent is supplied as a signal pulse photocurrent $\beta_M\cdot I_2$ to the arithmetic output circuit 32.

The arithmetic output circuit 32 comprises transistors 47, 48, 49, and 50, a compression diode 51 and the compression diode 52, a constant current source 53, and a buffer circuit BUF₁ and the buffer circuit BUF₂. The arithmetic output circuit 32 constitutes a log expansion circuit for obtaining a distance measurement arithmetic output.

The bases of the transistors 47 and 48 constituting a differential amplifier are connected to the anodes of the compression diodes 51 and 52 through the buffer circuits BUF₁ and BUF₂, respectively. The emitters of the transistors 47 and 48 are commonly connected to the constant current source 53. The collector of the transistor 48 is connected to the base of each of the transistors 49 and 50 constituting a current mirror circuit and the collector of the transistor 49.

Currents $I_{1b}$ and $I_{2b}$ respectively flowing through the compression diodes 51 and 52 are connected such that the signal pulse photocurrents output from the photocurrent detection circuits 31A and 31B flow. For this reason, in the arithmetic output circuit 32, the current $I_{1b}$ serves as the signal pulse photocurrent $\beta_N \cdot I_2$ from the photocurrent detection circuit 31B, and the current $I_{2b}$ serves as the signal pulse photocurrent $\beta_N \cdot I_1$ from the photocurrent detection circuit 31A. Therefore, equations (25) are established:

$$\left. \begin{array}{l} I_{1b} = \beta_N I_2 \\ I_{2b} = \beta_N I_1 \end{array} \right\} \quad (25)$$

A collector current IC of the transistor 48 is represented by equation (26):

$$I_C = \frac{I_{2b}}{I_{1b} + I_{2b}} \cdot I_E \quad (26)$$

where $I_E$ is the constant current of the constant current source 53.

A collector current $I_1'$ from the transistor 50, which is the output from the arithmetic output circuit 32, is given by equation (27) when equations (25) are substituted into equation (26):

$$I_1' = \frac{I_1}{I_1 + I_2} \cdot I_E \quad (27)$$

Figure 8:
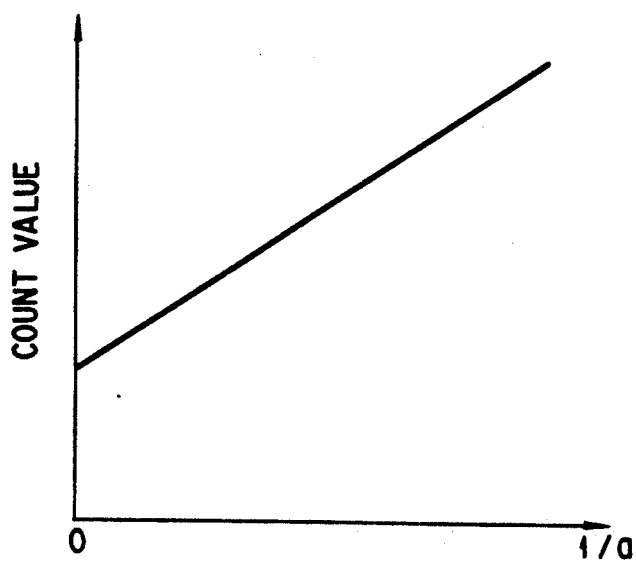
FIG. 8 is a graph showing the relationship between the distance measurement arithmetic output and the reciprocal of the object distance in FIG. 2.

The output current $I_1'$ of the arithmetic output circuit 32 allows the distance measurement within a range from ∞ to the nearest distance in accordance with the reciprocal of the object distance a, as shown in FIG. 8.

Slope correction, shift correction, and the like of the distance measurement output with respect to 1/a are performed under an assumption that correction values are stored in an EEPROM (not shown).

On the other hand, the count circuit 33 measures an integral value $I_1'$ of the collector current of the transistor 50 of the arithmetic output circuit 32 to cause a counter (not shown) incorporated in the control circuit 34 to measure a digital value.

The output current $I_1'$ of the arithmetic output circuit 32 is obtained as follows. The PSD 30 is set active in synchronism with projection. Upon every projection, the output current from the arithmetic output circuit 32 flows and the charges are stored in a capacitor 54. An operational amplifier 55 is used to reset the capacitor 54. The base of a control transistor 56 of the operational amplifier 55 is connected to the terminal T₃ of the control circuit 34 through a resistor 62. The transistor 56 is turned on in response to an output signal (FIG. 7) from the terminal T₃ to set the potential of the capacitor 54 to the reference voltage $V_{ref}$. The operational amplifier 55 is turned off and disabled immediately before projection. Thereafter, the potential of the capacitor 54 is increased by the injection current to the capacitor 54.

When the projection is completed by a predetermined number of times, the terminal T₄ goes from H to L (high level to low level), as shown in the timing chart of FIG. 7, and a transistor 57 is turned off through a resistor 63, thereby discharging the capacitor 54 by means of a transistor 58. At the same time, the counter incorporated in the control circuit 34 is operated until an output from a comparator 59 goes to H. When the terminal voltage across the capacitor 54 becomes lower than the reference voltage $V_{ref}$, the comparator 59 goes from L to H. The discharge rate of the capacitor 54 is determined by a constant current source 60 and a current mirror circuit consisting of a transistor 61 and the transistor 58 connected in series with the constant current source 60.

As described above, the output corresponding to the object distance is obtained as the count value of the counter in the control circuit 34.

Note that the arithmetic output circuit is not limited to the above arrangement, and that a detailed description of other circuits and operations is disclosed in Published Unexamined Japanese Patent Application No. 1-150809 and will be omitted therein.

In this manner, before the distance measurement pulsed light is emitted, the state of an input to the ordinary photocurrent detecting means is subjected to comparison and determination, and the bit values of the ordinary photocurrent extracting means are determined in units of weights. Most of the ordinary photocurrent is bypassed to GND. As a result, the ordinary light component superposed on the pulsed photocurrent can be set to be a smaller digital value than the pulsed photocurrent value.

The distance measurement error caused by leakage and dielectric absorption can be eliminated, and the distance can be accurately detected. The bit values can be determined in units of weights. A shorter period of time than that required in another digital ordinary photocurrent extracting apparatus (Published Unexamined Japanese Patent Application No. 2-195203) is needed to determine each digital value. Good response characteristics can be obtained even for the varying ordinary light components such as AC background light. In addition, a time from the power-ON operation to the distance measurement can be shortened.

In addition, the hold capacitor required in the conventional arrangement can be omitted, and the pins for connecting the external capacitor can be omitted, thus obtaining economical and dimensional advantages.

According to the first embodiment of the present invention, as has been described above, there is provided a distance measurement apparatus free from inconvenience for causing a distance measurement error, adverse influences on distance measurement precision, and problems on cost and space factor.

A distance measurement apparatus according to the second embodiment of the present invention will be described below.

As shown in FIG. 9, the distance measurement apparatus according to the second embodiment of the present invention comprises a projection section 71 for projecting pulsed light to a distance measurement object, a projection control section 72 for projecting the pulsed light from the projection section 71 to the distance measurement object a plurality of number of times, a light-receiving section 73 for receiving light reflected by the distance measurement object upon projection of the pulsed light by the projection control section 72 and outputting a photoelectric conversion signal, an analog distance measurement arithmetic section 74 for receiving the photoelectric conversion signal and calculating a distance to the distance measurement object, an A/D converter section 75 for A/D-converting the calculation result from the analog distance measurement arithmetic section 74, and an adder section 76 for adding the distance measurement results from the A/D converter section 75 in synchronism with projection by the projection control section 72 and digitally storing the sum. The distance measurement apparatus of this embodiment is characterized in that the distance to the distance measurement object is obtained on the basis of the output from the adder section 76. The distance to the distance measurement object is read out by a reading section 77.

The second embodiment will be described in detail with reference to the accompanying drawings. FIG. 10 is a perspective view of the distance measurement apparatus according to the second embodiment of the present invention.

A three-split SPD (silicon photodiode) 211 is formed on a distance measurement chip 212 to constitute a so-called sensor-on-chip arrangement. Only the three-split SPD 211 is exposed on the chip 212, and the remaining circuit area of the distance measurement IC is shielded with an aluminum deposition film. By this sensor-on chip arrangement, the sensor is connected to the distance measurement IC through aluminum internal wiring lines to reduce the number of pins of the distance measurement IC. As a result, the number of pins of the distance measurement IC of this embodiment is eight.

[1] $V_{CC1}$ terminal: this terminal is directly connected to the battery.
[2] $V_{CC2}$ terminal: this terminal is connected to the stabilized power source.
[3] COM terminal: this terminal is a serial communication terminal for the resultant distance measurement data and is connected to the CPU.
[4] CEN terminal: this terminal is an AFIC chip enable terminal and is connected to the CPU.
[5] GND terminal: this terminal is connected to GND.
[6] IRD1 terminal: this terminal is a terminal for driving an IRED 1 and is connected to the base of the drive transistor.
[7] IRD2 terminal: this terminal is a terminal for driving an IRED 2 and is connected to the base of the drive transistor.
[8] IRD3 terminal: this terminal is a terminal for driving an IRED 3 and is connected to the base of the drive transistor.

Figure 11:
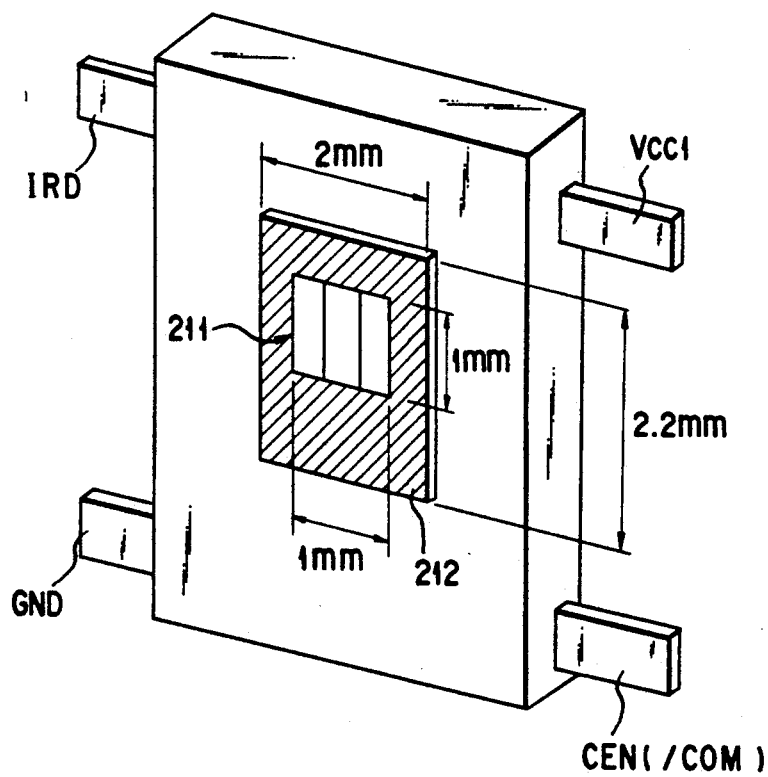
FIG. 11 is a perspective view of the distance measurement apparatus (FIG. 10) whose number of terminals is reduced.

FIG. 11 shows an arrangement in which the number of terminals in FIG. 10 is further decreased. More specifically, only one IRD terminal is used, a stabilized power source is arranged inside the circuit, and the CEN and COM terminals are commonly used. In this case, the total number of terminals is four.

Figure 12:
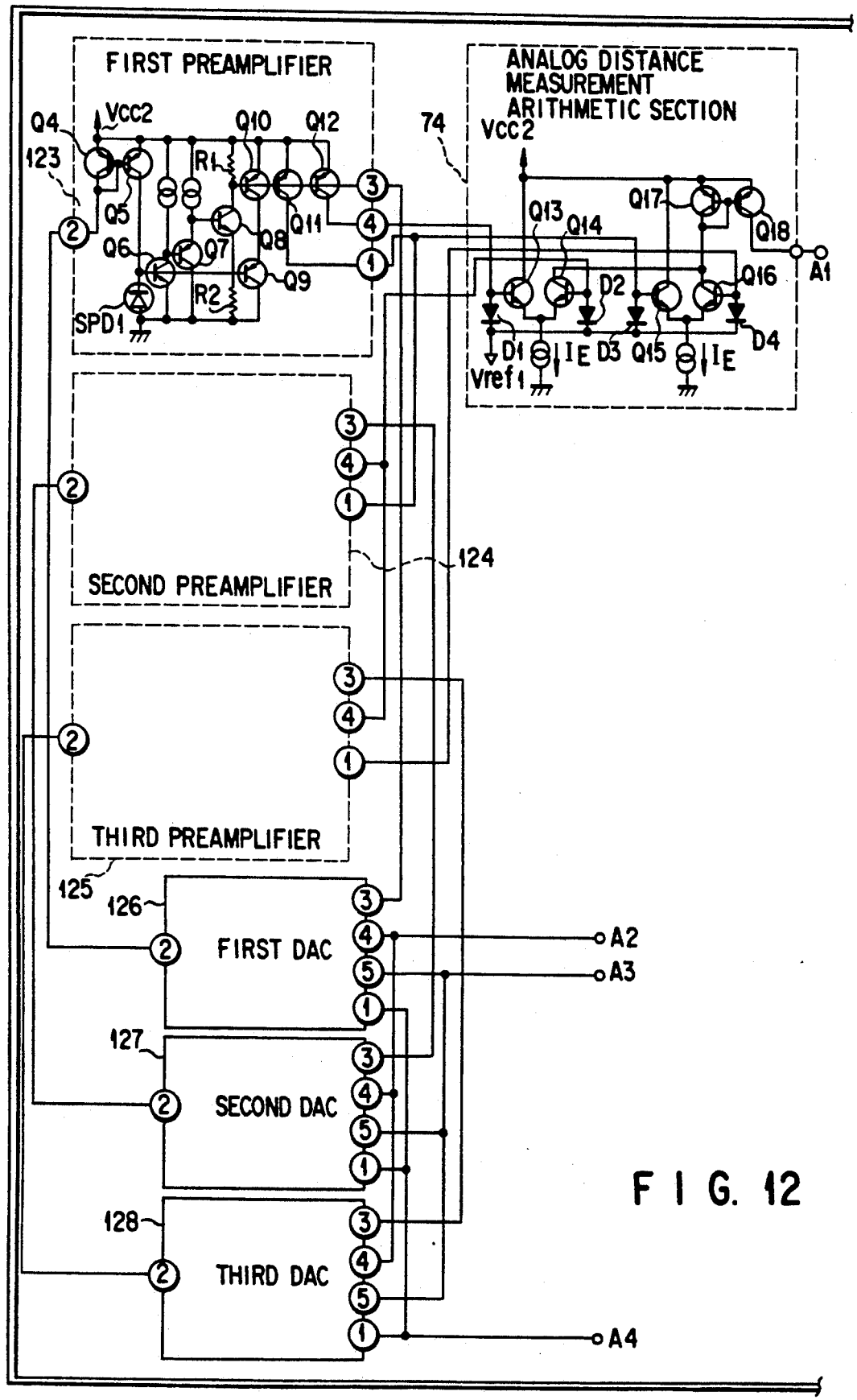
FIG. 12 is a circuit diagram of a light-receiving section and an analog distance measurement arithmetic section in the internal equivalent circuit of a distance measurement IC according to the second embodiment of the present invention.

FIGS. 12 and 13 are block diagrams of internal equivalent circuits of the distance measurement chip 212. The light-receiving section and the analog distance measurement arithmetic section are shown in FIG. 12, and the sections from the A/D converter section except for the above light-receiving and analog distance measurement arithmetic sections are shown in FIG. 13. Connectors between FIGS. 12 and 13 are represented by reference numerals A1, A2, A3, and A4. For the sake of simplicity, the circuit block arrangement (FIG. 11) having a smaller number of IC pins is exemplified. The distance measurement chip 212 in FIG. 10 is simply a modification of the above circuit arrangement, so that a description of the second embodiment according to the present invention will be made with reference to the circuit block arrangements in FIGS. 12 and 13.

First, the power-ON operation of the distance measurement IC shown in FIGS. 12 and 13 will be described below. When the CEN terminal (FIG. 13) goes to "L", a pnp transistor Q1 is turned on, and a current flows in the bases of npn transistors Q2 and Q3. The collector of the transistor Q2 extracts a current from the base of the transistor Q1. In this manner, once the CEN terminal goes to "L", a circuit system consisting of the transistors Q1 and Q2 is positively fed back to keep the transistor Q3 on.

The collector of the transistor Q3 is connected to the PW input terminal of a control circuit block 121. When this PW input terminal goes to "L", the control circuit block 121 is powered on. The internal power-ON/reset function of the control circuit block 121 is performed, and then a predetermined sequence is started. The collector of the transistor Q3 is also connected to another circuit including a stabilized power source circuit 122, and each circuit block is powered on.

The stabilized power source circuit 122 is a circuit block for generating a stabilized voltage $V_{CC2}$, a reference voltage $V_{ref1}$, and a reference voltage $V_{ref2}$ from a voltage $V_{CC1}$ directly coupled to the battery. Although the battery voltage $V_{CC1}$ varies with large-current driving during IRED projection, the stabilized voltage $V_{CC2}$ and the reference voltage $V_{ref1}$ and $V_{ref2}$ are free from such variations.

A first preamplifier block 123 uses a stabilized voltage $V_{CC2}$. In the first preamplifier block 123, npn transistors Q4 and Q5 constitute a current mirror circuit. A current having the same current value as that of a sync current at an output terminal ② of a first DAC (D/A converter) 126 is injected to the cathode of an SPD 1 through the collector of the transistor Q5. This current value is set to cancel a background (ordinary light) photocurrent produced in the SPD 1 in accordance with a mechanism to be described later.

The operation of the first preamplifier block 123 having the above arrangement will be briefly described. Assuming that the photocurrent of the SPD 1 is increased by $\Delta I_1$, the increase in current is amplified by a transistor Q6 to increase the emitter potential of a transistor Q7. The collector potential of a transistor Q8 changes in a direction to decrease from the stabilized voltage $V_{CC2}$. As a result, a base-emitter voltage of each of transistors Q10, Q11, and Q12 is increased, so that the collector currents of the transistors Q10, Q11, and Q12 are increased. Note that the collector of the transistor Q10 is connected to the emitter of the transistor Q9, and the base of the transistor Q9 is connected to the cathode of the SPD 1.

The collector current of the transistor Q10, therefore, is set to be $1/\beta$ that of the transistor Q9 and is fed back to the cathode of the SPD 1. This collector current is balanced when an increase $\Delta I_{C1}$ in the collector current of the transistor Q10 is set as follows:

$$\Delta I_{C1}/\beta = \Delta I_1 \qquad (28)$$

Since the transistors Q10, Q11, and Q12 constitute a current mirror circuit, the photocurrent $\Delta I_1$ input to the SPD 1 is amplified to $\beta \Delta I_1$ as the collector outputs from the transistors Q11 and Q12. Since remaining preamplifier circuit blocks 124 and 125 operate in the same manner as in the first preamplifier block 123, a detailed description thereof will be omitted.

A means for canceling the background photocurrent will be described below. The background photocurrents corresponding to the respective SPDs are output to terminals ③ of the preamplifier circuit blocks 123, 124, and 125, respectively. The background photocurrents are sequentially compared by the first DAC 126, and second and third DACs (D/A converters) 127 and 128 to feed back outputs to feed back terminals ② of the preamplifier circuit blocks 123, 124, and 125, thereby canceling the background photocurrents.

Figure 14:
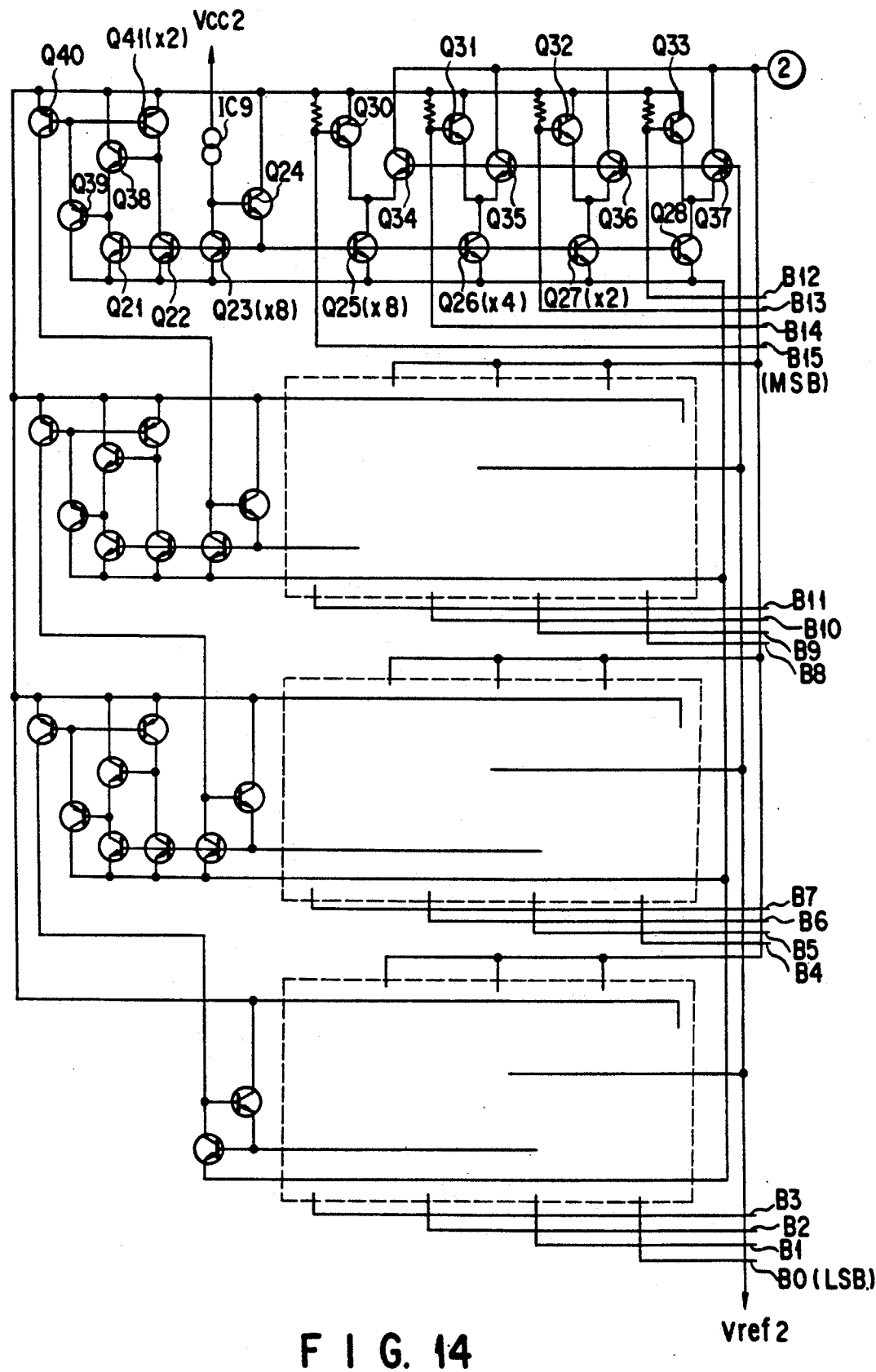
FIG. 14 is a circuit diagram of a current weighting circuit in a background light canceler section in FIG. 12.
Figure 15:
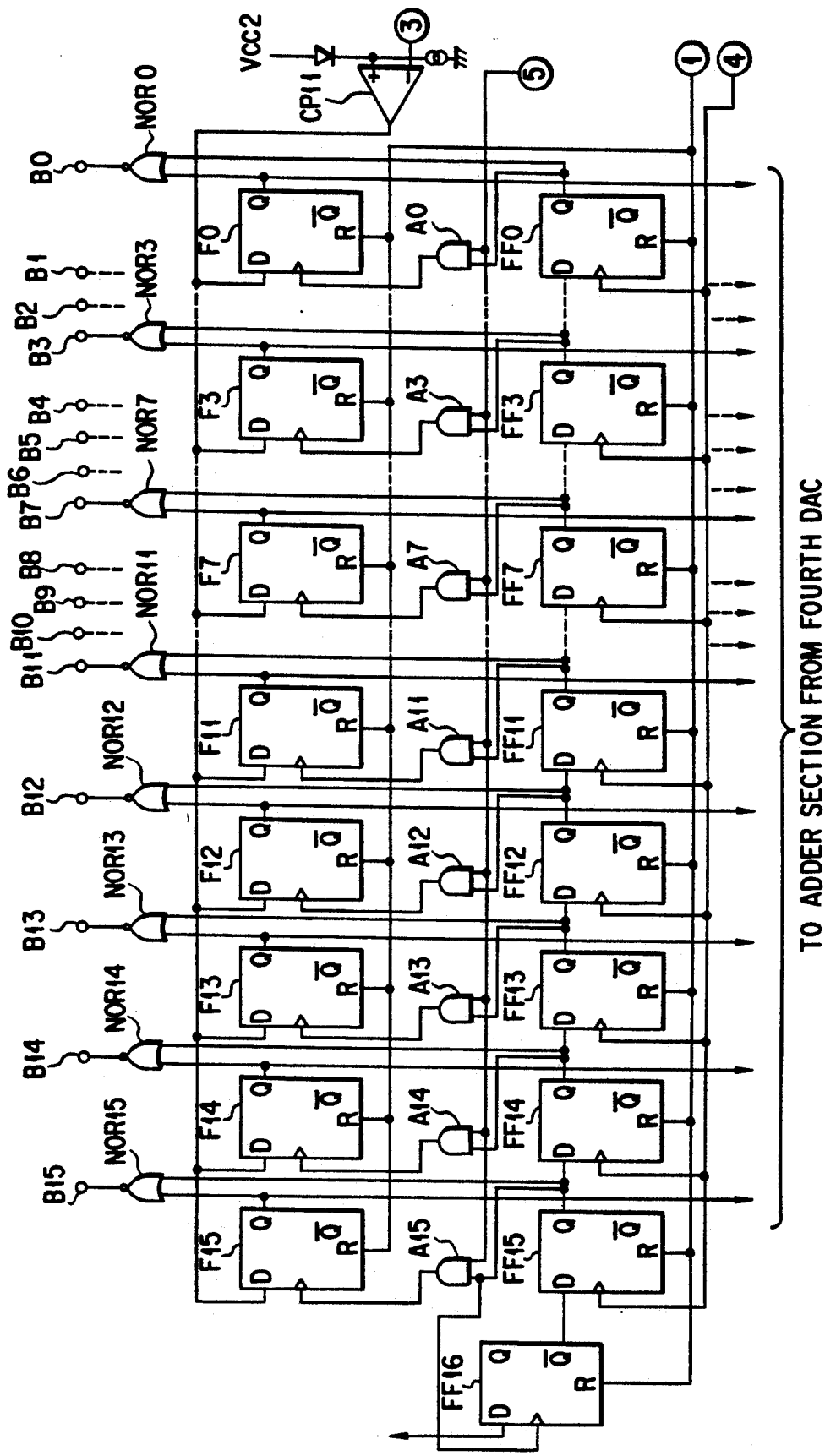
FIG. 15 is a block diagram of the main part of a logic section in the background light canceler section in FIG. 12.

Each DAC described above basically has the same arrangement as the ordinary photocurrent extraction circuits 35A and 35B in the first embodiment and comprises a logic circuit constituted by a 16-bit shift register and a latch shown in FIG. 15 and current weighting circuits shown in FIG. 14. The current weighting circuits shown in FIG. 14 constitute a 16-bit arrangement. A section corresponding to B15 as the most significant bit to B12 is illustrated at the uppermost position, a section corresponding to B11 to B8 is illustrated at the second upper position, a section corresponding to B7 to B4 is illustrated at the third upper position, and a section corresponding to B3 to B0 as the least significant bit is illustrated at the lowermost position. These sections have only different reference current values, and therefore, only the uppermost section will be described below.

If the reference emitter area of each of transistors Q21, Q22, Q24, Q28, and Q40 is defined as 1, the emitter area of each of transistors Q27 and Q41 is twice the reference emitter area, the emitter area of a transistor 26 is four times the reference emitter area, and the emitter area of each of the transistors Q23 and Q25 is eight times the reference emitter area on the pattern. The transistor Q21, transistors Q38 and Q39, and the transistors Q40 and Q41 constitute a current mirror circuit. Similarly, the transistors Q21 to Q28 constitute a current mirror circuit.

If the constant current value of a constant current source IC9 is defined as 5 $\mu$A, the collector currents of the transistors are set as follows:

| | |
|---|---|
| Collector current of Q25: | 5 $\mu$A |
| Collector current of Q26: | 5/2 $\mu$A |
| Collector current of Q27: | $5/2^2$ $\mu$A |
| Collector current of Q22/Q28: | $5/2^3$ $\mu$A |
| Collector current of Q40: | $5/2^4$ $\mu$A |

The collector current of $5/2^4$ (=5/16) $\mu$A of the transistor Q40 serves as a basic current for the following four bits, i.e., B11 to B8. Note that the above currents are called weighted currents hereinafter.

These weighted currents are or are not output from the ② as the collector currents of transistors Q34, Q35, Q36, and Q37 in accordance with the ON/OFF control of transistors Q30, Q31, Q32, and Q33. This terminal ② is connected to the terminals ② of the first, second, and third preamplifier circuit blocks 123, 124, and 125 (FIG. 12), so that the collector currents of the transistors Q4 of the first, second, and third preamplifier circuit blocks 123, 124, and 125 are extracted.

The current weighting circuits are arranged in four stages having the same arrangement, and the current output at the terminal ② can be controlled to a maximum of 5 $\mu$A, 5/2 $\mu$A, $5/2^2$ $\mu$A, $5/2^3$ $\mu$A, $5/2^4$ $\mu$A, $5/2^5$ $\mu$A, $5/2^6$ $\mu$A, $5/2^7$ $\mu$A, $5/2^8$ $\mu$A, $5/2^9$ $\mu$A, $5/2^{10}$ $\mu$A, $5/2^{11}$ $\mu$A, $5/2^{12}$ $\mu$A, $5/2^{13}$ $\mu$A, $5/2^{14}$ $\mu$A, and $5/2^{15}$ $\mu$A.

FIG. 15 is a block diagram showing the main part of the logic section constituting the first to fourth DACs. Seventeen D flip-flops FF0 to FF16 constituting a 16-bit shift register, 2-input AND gates A0 to A15 enabled/disabled in response to a latch signal LATCH1 or LATCH2 output from the control circuit block 121 (FIG. 13), 16 D flip-flops F0 to F15 constituting a latch circuit, and NOR gates NOR0 to NOR15 for ON/OFF-controlling the transistors Q34, Q35, Q36, and Q37 in FIG. 14 are connected as shown in FIG. 15.

The operation of the logic section having the above arrangement will be briefly described below.

(1) Reset Mode

When a reset signal RSI is supplied from the control circuit block 121 to the terminal ②, all the D flip-flops FF0 to FF16 and the D flip-flops F0 to F15 are reset, so that the Q outputs thereof go to L level. Outputs BO to B15 from the NOR gates NOR0 to NOR15 go to H level. The transistors Q30 to Q33 of the weighting circuits shown in FIG. 14 are turned on. Therefore, no current is extracted from the terminal ② of the current weighting circuit.

(2) Output of First Clock Pulse CK1

When the first clock pulse CK1 is output, only the flip-flop FF15 of the 16-bit shift register is set. Since the output from the NOR gate NOR15, i.e., only the B15 goes to L level. Only the gate transistor Q30 of the current weighting circuit is turned off, and the transistor Q34 is turned on. Therefore, a current of 5 $\mu$A is extracted from the terminal ②, as described above.

In this state, when the background photocurrent produced by the SPD 1 (FIG. 13) in the first preamplifier circuit block is larger than the current supplied from the transistor Q5 therein, the voltage of the transistor Q10 in this amplifier circuit block is decreased. This voltage is supplied from the terminal ③ of this amplifier circuit block to the inverting input terminal of a comparator CP11 of the logic section through the terminal ③ of the first DAC 126. The output terminal of the comparator CP11 goes to H level. On the other hand, when the current extracted from the terminal ② of the current weighting circuit is larger than the background photocurrent of the SPD 1 of the first preamplifier block, the output from the comparator CP11 in the logic section goes to L level.

(3) Output of Latch Signal

When the latch signal LATCH1 from the control circuit block 121 is set active (H level), one input terminal of each of the AND gates A0 to A15 is set at H level through a terminal ⑤ of the logic section. In this case, since only the flip-flop FF15 is in a set state, the output from the comparator CP11 is loaded in the flip-flop FF15 and is stored or latched. As a result, even when the clock pulse CK1 is output from the control circuit block 121, the control transistor Q30 in the current weighting circuit is ON/OFF-controlled in accordance with the output from the comparator CP11 upon output of the H-level signal from the flip-flop FF15, thereby performing sequential comparison type A/D conversion.

(4) When the second clock pulse CK1 is output from the control circuit block 121, the flip-flop FF14 is set to perform operations (2) and (3). In this case, since the control transistors Q31 of the current weighting circuits are ON and OFF, extraction currents are different from each other. The above operations are repeated until the flip-flop FF1 is set.

The distance measurement operation of the second embodiment will be described with reference to the timing chart of FIG. 16. When the RS1 terminal of the control circuit block 121 (FIG. 13) goes to L, all the D flip-flops in FIG. 15 are cleared. When one pulse CK1 is output, the Q output from the flip-flop FF15 goes to H level, and the transistor Q30 is turned off. The output at the terminal ② of the current weighting circuit is set to be $-5$ $\mu A$. That is, a current of 5 $\mu A$ is supplied to the SPD 1 through the current mirror circuit constituted by the transistors Q4 and Q5 in FIG. 12. At this time, if the background photocurrent produced by the SPD 1 is larger, the base potential of each of the transistors Q10, Q11, and Q12 is high with reference to the stabilized voltage VCC2. The output from the comparator CP11 in FIG. 15 is set at H level.

At this time, when the latch signal LATCH1 is output from the control circuit block 121, the CK terminal of the flip-flop F15 is triggered, and the Q output from the flip-flop F15 is set at H level. On the other hand, when the background photocurrent is smaller than the value set by the current weighting circuit, the Q output from the flip-flop F15 is set at L level.

When the second pulse CK1 is output from the control circuit block 121, the Q output from the flip-flop FF15 is set at L level, and its $\overline{Q}$ output goes to H level. Instead, the Q output from the flip-flop FF14 goes to H level, and its $\overline{Q}$ output goes to L level, so that the next current weight of $5/2$ $\mu A$ is set ON.

When the same sequence as described above is repeated to completely output 16 pulses CK1 and 16 pulses of the latch signal LATCH1, the currents corresponding to the background photocurrent of the SPD 1 are output from the current weighting circuits, thereby canceling the background photocurrent. The background photocurrents produced by the SPD 2 and the SPD 3 except for the SPD 1 can be canceled by the second and third DACs 127 and 128.

The control circuit block 121 then outputs a pulse of a signal IRD0 to drive the IRD terminal, thereby projecting the pulsed light on the object. Reflected light components $\Delta I_1$, $\Delta I_2$, and $\Delta I_3$ of the SPD 1, the SPD 2, and the SPD 3 are multiplied with $\beta$ like the collector output $\beta \Delta I_1$ from each of the transistors Q11 and Q12 in FIG. 12, and the multiplied signal is output from the corresponding preamplifier block.

These amplified pulsed photocurrents are input to the next analog distance measurement arithmetic section 74, and the following currents are supplied to the corresponding diodes:

$\beta \Delta I_1$ for diode D1
$\beta(\Delta I_2 + \Delta I_3)$ for diode D2
$\beta(\Delta I_1 + \Delta I_2)$ for diode D3
$\beta \Delta I_3$ for diode D4

At this time, the collector current of the transistor Q14 is output as follows:

$$\frac{\Delta I2 + \Delta I3}{\Delta I1 + \Delta I2 + \Delta I3} \cdot I_E \qquad (29)$$

The collector current of the transistor Q16 is output as follows:

$$\frac{\Delta I3}{\Delta I1 + \Delta I2 + \Delta I3} \cdot I_E \qquad (30)$$

The sum of these collector currents is folded by the current mirror circuit constituted by the transistors Q17 and Q18 and is supplied to the A/D converter section 75 constituted by a fourth DAC 130 and a comparator CP1:

$$\frac{\Delta I2 + 2\Delta I3}{\Delta I1 + \Delta I2 + \Delta I3} \cdot I_E \qquad (31)$$

Figure 17:
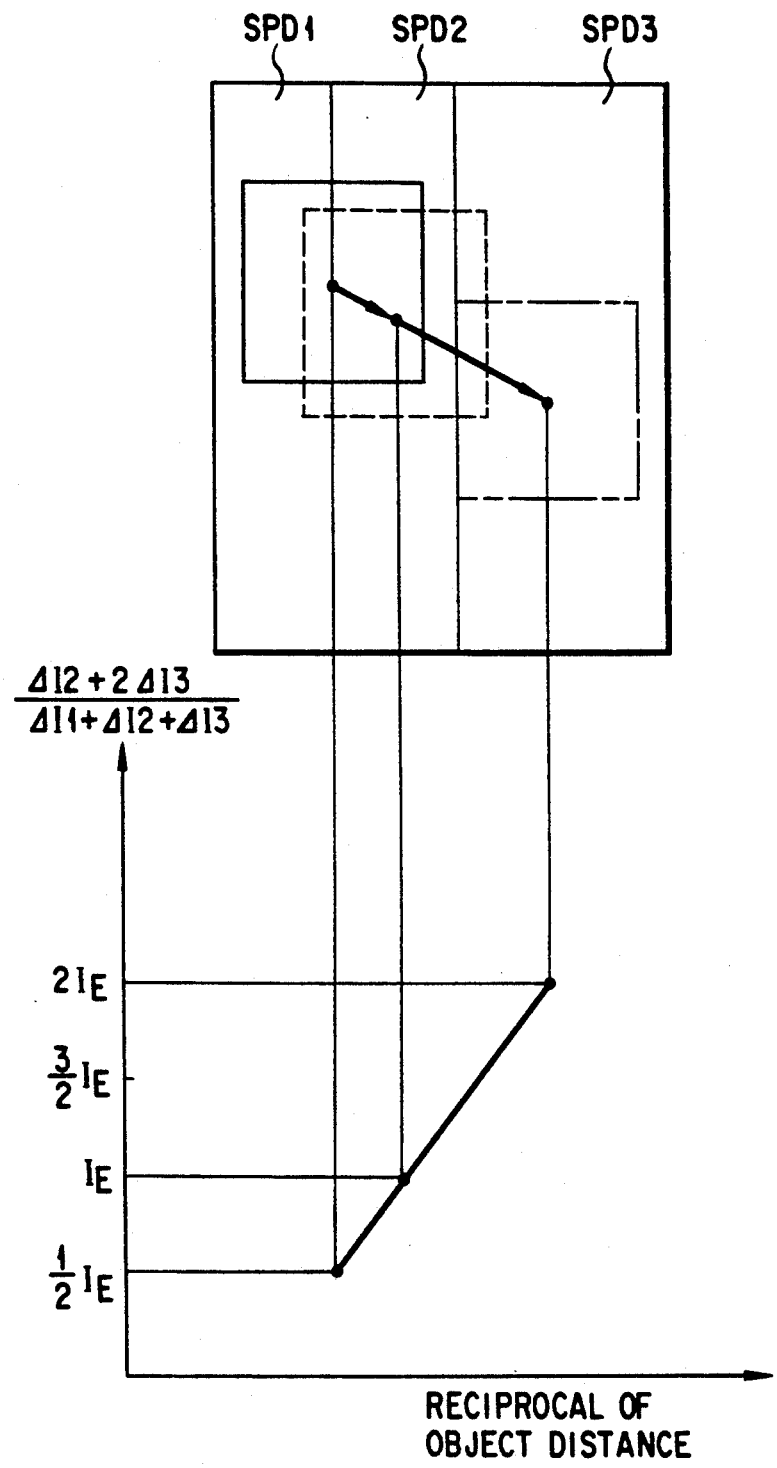
FIG. 17 is a graph obtained by plotting distance measurement arithmetic outputs corresponding to incident positions of reflected light spots in FIG. 16.

This indicates that a linear output corresponding to the incident position of the reflected light spot is supplied, as shown in FIG. 17. That is, a distance measurement output proportional to the reciprocal of the object distance is obtained.

A/D conversion of the obtained distance measurement output in the A/D converter section 75 will be described below. During projection, distance measurement outputs are kept generated. Each distance measurement output is supplied to a terminal ② of the fourth DAC 130 and the inverting input terminal of the comparator CP1 having the noninverting input terminal which receives the reference voltage $V_{ref2}$. A comparison output is input to a terminal ③ of the fourth DAC 130. The control circuit block 121 supplies 16 pulses using a reset signal RS2, the latch signal LATCH2, and the clock pulse CK1 during projection in the same procedures as in canceling of the background photocurrent described above, thereby completing A/D conversion.

When one pulse of a latch signal LATCH3 is output from the control circuit block 121 upon completion of the above A/D conversion, the adder section 76 adds 16-bit digital data from the fourth DAC 130 to the value held therein, in response to this pulse. In this case, the data in the adder section 76 is cleared in advance in response to the reset pulse RS1 as the active L pulse supplied during cancellation of the background photocurrent.

The A/D conversion and the addition are performed for every one of the 16 projection operations. The adder section 76 accumulates the distance measurement outputs. When the 16-time accumulation is completed, the control circuit block 121 outputs a pulse of a latch signal LATCH4, and the accumulation content of the adder section 76 is shifted to a shift register 129. In this case, the decimal point is also shifted to the left by four digit positions, and the average value of the 16 accumulation outputs is calculated. The resultant value is output from the CEN terminal of the shift register 129 in an order from the most significant bit in synchronism with the clock pulse from the SCLOCK terminal. In this manner, since the average value is output from the most significant bit, the communication time can be shortened in accordance with required distance measurement precision.

More specifically, if only coarse data is required, only the upper bits may be read. However, if fine data is required, a larger number of data bits may be read. Therefore, a distance measurement apparatus compatible with cameras requiring different precision levels can be provided.

Since digital values are accumulated, the time interval between the time when the CEN terminal is set active low to the time when the distance measurement data is output can be kept constant regardless of the distances to the objects. Therefore, the communication format becomes simple, and reliability can be improved.

When the communication is completed, the control circuit block 121 sets its OFF terminal active low. All the transistors Q3, Q2, and Q1 are turned off, and the apparatus is powered off to complete all the operations.

FIG. 18 is a block diagram showing the main part of a distance measurement apparatus according to the third embodiment of the present invention. In the second embodiment, the three SPDs are used as the light-receiving elements. In the third embodiment, only one PSD is used. When the SPD as the light-receiving element is replaced with the PSD, a light-receiving section and an analog distance measurement arithmetic section are different from those in the second embodiment. However, circuits from an A/D converter section are the same as those in the second embodiment (FIG. 13). Therefore, FIGS. 18 and 13 show the internal equivalent circuits of a distance measurement IC of the third embodiment.

A general PSD is arranged such that a p-type semiconductor is formed on an n-type semiconductor, and the incident position of a reflected light spot is obtained in accordance with a division ratio of resistance components of the p-type semiconductor. On the other hand, an IC is manufactured by forming n- and p-type regions on the basis of the p-type semiconductor. In general, the PSD and the distance measurement IC are formed on different chips. For this reason, IC pins are required to connect the PSD and the IC.

Figure 19:
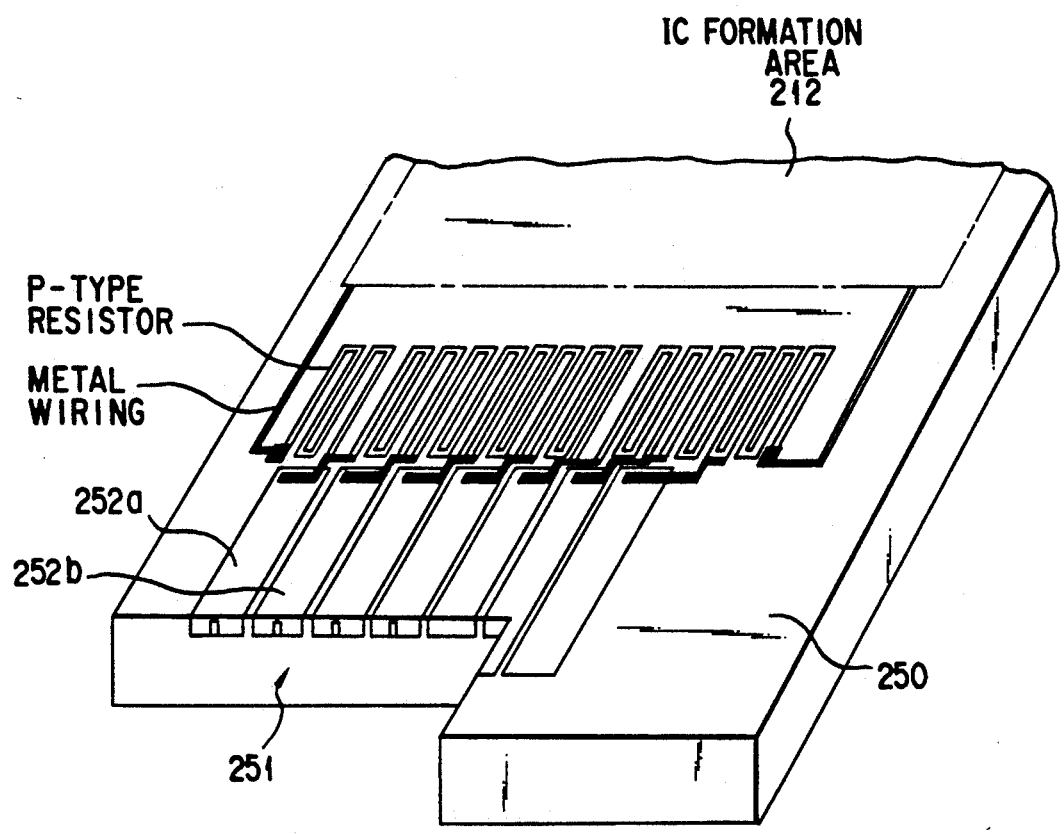
FIG. 19 is a perspective view showing the main part of a PSD capable of being integral with an IC according to the third embodiment.

In this embodiment, as shown in FIG. 19, a plurality of n-type semiconductor layers 252a, 252b, ... are formed on a p-type semiconductor substrate 251, and a light-receiving element (PSD) 250 is formed by joining the respective n-type semiconductor layers with p-type resistance layers, thereby obtaining a new chip 260 in which an IC section 212 and the PSD 250 are formed integral with each other, and hence reducing the number of pins.

Figure 20:
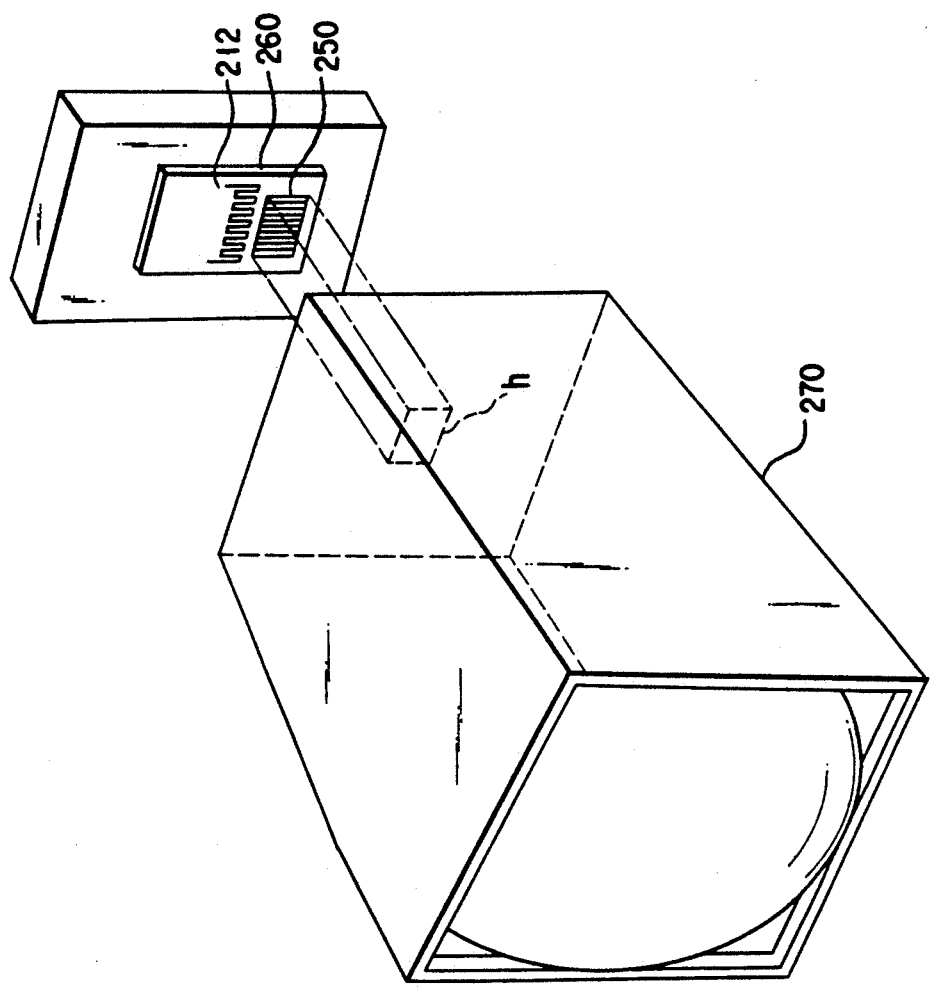
FIG. 20 is a perspective view of a light-receiving optical system set in the light-receiving section according to the third embodiment of the present invention.

The chip 260 is set in a light-receiving optical system 270 having an opening h almost equal to the size of the light-receiving portion, as shown in FIG. 20. By employing this optical system, an erroneous operation of phototransistors of the IC section 212 upon incidence of unnecessary light on a portion of the IC section 212 except for the light-receiving section 250 of the chip 260 is prevented.

Figure 21:
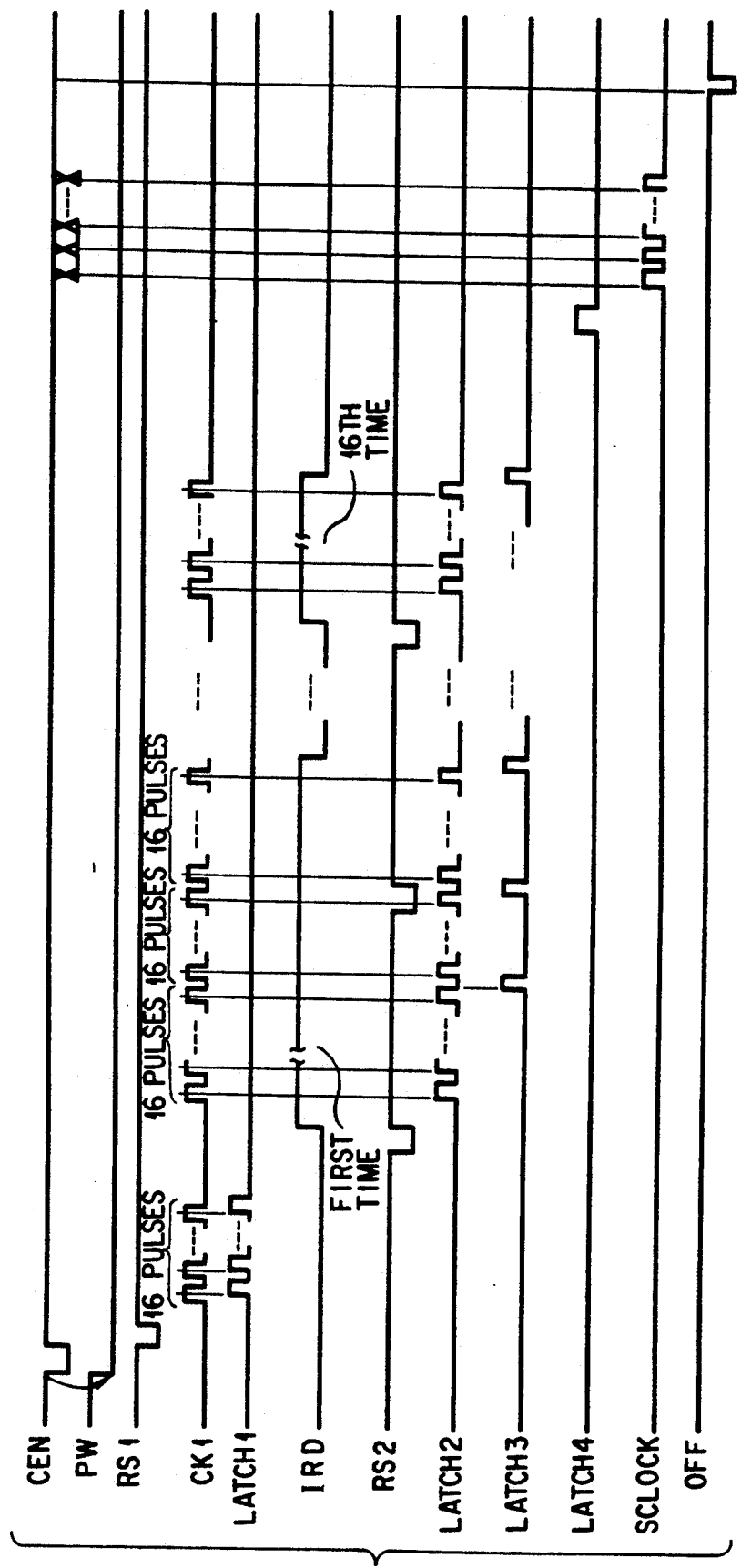
FIG. 21 is a timing chart of a distance measurement operation according to the third embodiment.
Figure 26:
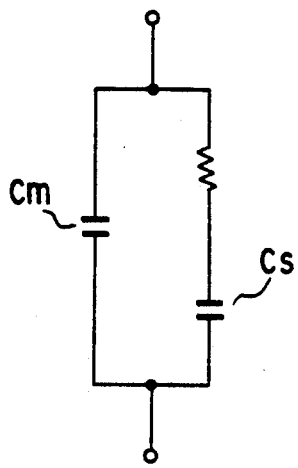
FIG. 26 is an equivalent circuit diagram of an external capacitor in the conventional distance measurement apparatus.
Figure 27A:
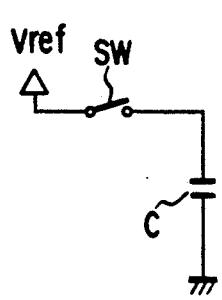
FIGS. 27A and 27B are a circuit diagram and a timing chatt, respectively, showing a state in which a voltage is applied to a capacitor represented by the equivalent circuit shown in FIG. 26.
Figure 27B:
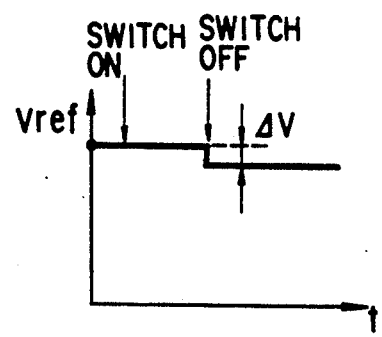
Figure 23:
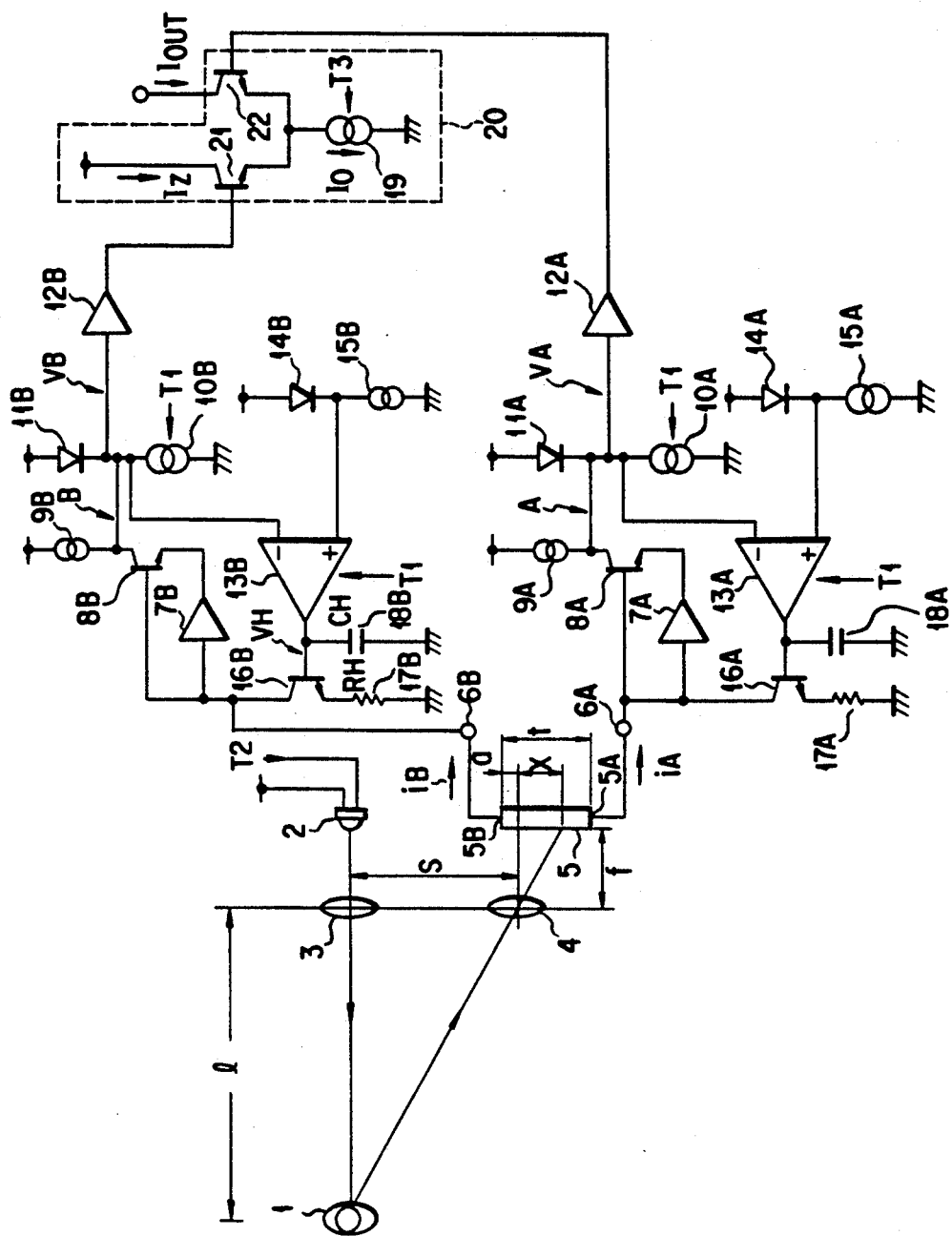
FIG. 23 is a circuit diagram of a conventional distance measurement apparatus using a PSD.
Figure 24:
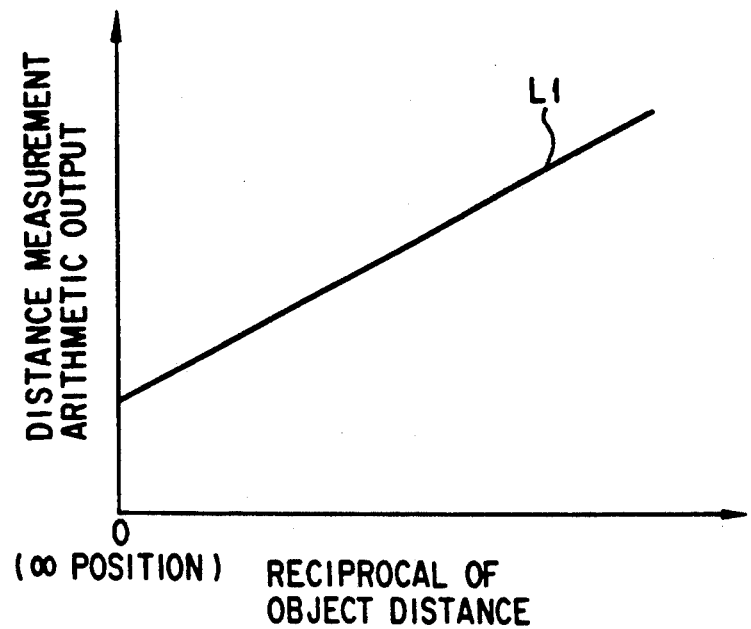
FIG. 24 is a graph showing the distance measurement arithmetic output as a function of the reciprocal of the object distance in FIG. 23.
Figure 25:
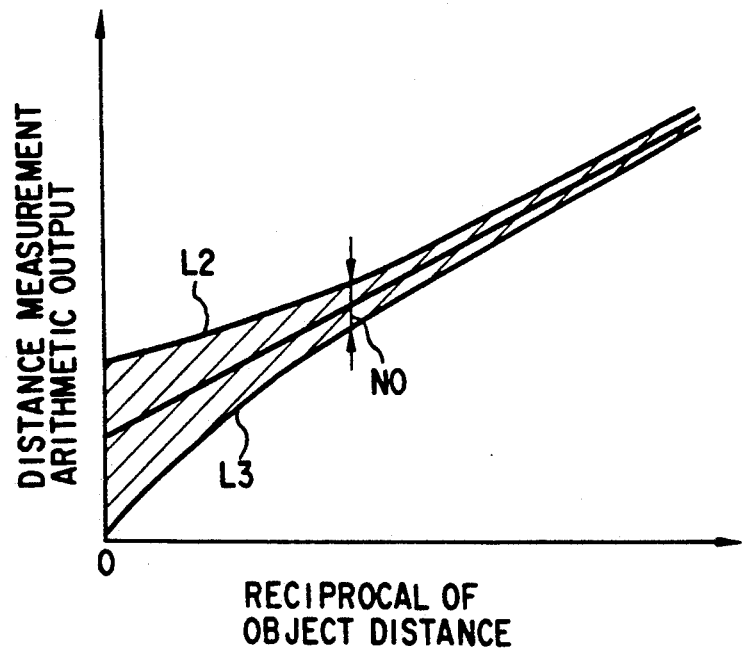
FIG. 25 is a graph showing a state in which noise is superposed in FIG. 24.

Since current weighting circuits and the like of the third embodiment are the same as those of the second embodiment described above, a detailed description thereof will be omitted, and a background light cancellation sequence will be described with reference to a timing chart in FIG. 21.

An RSI terminal goes to L level, and all D flip-flops shown in FIG. 15 are cleared. When the first clock pulse CK1 is output, the Q output from the flip-flop FF15 goes to H level, and its $\overline{Q}$ output goes to L level. At this time, a transistor Q30 is turned off, and an output at a terminal $\overline{2}$ of the current weighting circuit becomes $-5$ µA accordingly.

A current of 5 µA is supplied to one channel CH1 of the PSD through a current mirror circuit constituted by transistors Q4 and Q5 in FIG. 18. At this time, if the magnitude of the background photocurrent produced at the channel CH1 is larger, the base potential of a transistor Q6 is decreased, and a collector current of a transistor Q11 is increased. If this collector current value is larger than that of a current source $I_1$, the output from a comparator CP12 (FIG. 22) corresponding to the comparator CP11 of the logic section (FIG. 15) is set at H level. At this time, when a control circuit block outputs a pulse of the latch signal LATCH1, the CK terminal of the flip-flop F15 is triggered to set the Q output of the flip-flop F15 at H level. On the other hand, when the background photocurrent is smaller than the value set in the current weighting circuit, data of L level is stored.

When the second clock pulse CK1 is output, the flip-flop FF15 is reset, and the flip-flop FF14 is set, thereby setting the next current weight of 5/2 µA ON.

The above sequence is repeated. When the 16 pulses CK1 and 16 pulses of the latch signal LATCH1 are completely output, a current corresponding to the background photocurrent of the PSD is output from the current weighting circuit. As a result, the background photocurrent is canceled. On the other hand, the same operation as described above is performed in the other channel CH2 of the PSD.

The control circuit block outputs a pulse of a signal IRD0 to drive the IRD terminal, thereby projecting pulsed light on the object. At this time, if reflected light components of the channels CH1 and CH2 of the PSD are defined as $\Delta I_1$ and $\Delta I_2$, they are multiplied with β by sub pnp transistors Q9 and Q9', and the multiplied signals are output from transistors Q11 and Q11'. The outputs from the transistors Q11 and Q11' are input to diodes D2 and D1 of an analog distance measurement arithmetic section 74a. At this time, the collector current of a transistor Q14 is defined as follows:

$$\frac{\Delta I_1}{\Delta I_1 + \Delta I_2} \cdot I_E \tag{32}$$

and this collector current is folded by a current mirror circuit constituted by transistors Q17 and Q18 and is input an A/D converter section 75.

The A/D conversion and addition operations of the resultant distance measurement output in the A/D converter section 75 and an adder section 76 are the same as those in the second embodiment, and a detailed description thereof will be omitted. Unlike the second embodiment, the A/D conversion and addition operations are performed a plurality of number of times during one projection cycle to reduce A/D conversion errors by bit omissions caused by noise during A/D conversion.

When the above projection cycle and the accumulation of the distance measurement outputs in the adder section 76 are completed, a control circuit block 121 outputs a pulse of a latch signal LATCH4 to shift the accumulation content of the adder section 76 to a shift register. An output from the shift register appears from the most significant bit from the CEN terminal of the shift register in synchronism with a clock pulse from the SCLOCK terminal. When all the output operations are completed, the control circuit block 121 sets the OFF terminal at L level, and the transistors Q3, Q2, and Q1 are turned off. The apparatus is powered off to complete the distance measurement operation.

According to the second and third embodiments, since a hold capacitor need not be used, a distance measurement arithmetic output obtained in synchronism with emission of the pulsed distance measurement light is A/D-converted during projection, and the resultant digital values are added and accumulated in a digital memory a plurality of number of times, voltage variations caused by the physical properties (e.g., leakage and dielectric absorption) of the capacitor do not occur and the distance can be accurately measured, as compared with the conventional arrangement in which a hold capacitor is used and the distance measurement arithmetic outputs are accumulated in the hold capacitor. Therefore, distance measurement precision can be greatly improved. At the same time, since an external capacitor can be omitted, and the number of IC pins for connecting this external capacitor can be omitted, the distance measurement IC can be made compact at low cost.

According to the second and third embodiments of the present invention, the object distance obtained in the analog distance measurement arithmetic section can be A/D-converted, and the digital data are digitally accumulated by the adder section to obtain a distance to the distance measurement object. Therefore, a hold capacitor and an integral capacitor, which have been required in the conventional distance measurement apparatus, can be omitted, thus providing great industrial advantages.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A distance measurement apparatus for a camera, comprising:
   an infrared-emitting diode for projecting an infrared-ray on a distance measurement object a plurality of number of times;
   an optical position detection element for receiving light reflected by the distance measurement object upon incidence of the infrared-ray thereon and outputting a photocurrent corresponding to an irradiated position of the light and an ordinary photocurrent;
   a first A/D converter for detecting the ordinary photocurrent of said optical position detection element prior to projection operations performed by said infrared-emitting diode the plurality of number of times, and converting a detected ordinary photocurrent into a digital signal;
   a first digital memory circuit for storing the digital signal converted by said first A/D converter;
   a current extraction circuit for setting a current having a value corresponding to a storage value of said first digital memory circuit in the projection operations, and extracting a set current from the photocurrents output by said optical position detection element;
   an analog arithmetic circuit for outputting an analog distance signal corresponding to a distance to the distance measurement object, using an output current of said optical position detection element from which the set current corresponding to the ordinary photocurrent is extracted by said current extraction circuit;
   a second A/D converter for converting the analog distance signal into a digital distance signal;
   a second digital memory circuit in which latest outputs from said second A/D converter are sequentially added and accumulated every time the projection operation is performed; and
   a processing circuit for performing digital processing corresponding to arithmetic averaging of data accumulated in said second digital memory circuit upon completion of the projection operations performed the plurality of number of times.

2. A distance measurement apparatus comprising:
   projecting means for projecting an infrared-ray on a distance measurement object;
   light-receiving means for receiving light reflected by the distance measurement object upon projection of the infrared-ray on the distance measurement object, and outputting a photocurrent corresponding to an irradiated position of the light and an ordinary photocurrent;
   first A/D converting means for detecting the ordinary photocurrent output from said light-receiving means prior to a projection operation by said projecting means, and converting a detected ordinary photocurrent into a digital signal;
   first digital memory means for storing the digital signal converted by said first A/D converting means;
   current extracting means for extracting a current component corresponding to a storage value of said first digital memory means from the photocurrents output by said light-receiving means during the projection operation;
   analog arithmetic means for outputting an analog distance signal corresponding to a distance to the distance measurement object, using an output current from said light receiving means upon processing by said current extracting means;
   second A/D converting means for converting the analog distance signal into a digital distance signal; and
   second digital memory means for storing an output from said second A/D converting means.

3. A distance measurement apparatus comprising:
   projecting means for repeatedly projecting light on a distance measurement object;
   light-receiving means for receiving light reflected by the distance measurement object upon projection of the light on the distance measurement object and outputting a photocurrent containing an ordinary photocurrent component;
   ordinary photocurrent extracting means for storing the photocurrent as the ordinary photocurrent component output by said light-receiving means during non-projection of said projecting means, extracting the ordinary photocurrent component from the photocurrent during projection of said projection means by using a storage value, and outputting a signal corresponding to the projection, the ordinary photocurrent component being digitally stored;

arithmetic means for calculating an analog object distance using the signal output by said ordinary photocurrent extracting means; and accumulating means for accumulating outputs from said arithmetic means in accordance with repeated projection by said projecting means and outputting an average object distance of all projection operations, said accumulating means converting an analog output from said arithmetic means into digital data, and accumulating converted digital values.

4. An apparatus according to claim 3, wherein said light-receiving means, said ordinary photocurrent extracting means, said arithmetic means, and said accumulating means are formed as an integrated circuit on a single substrate.

5. A distance measurement apparatus comprising:

projecting means for projecting a beam toward an object;

light-receiving means for receiving light reflected by the object upon incidence of the beam thereon and outputting a photocurrent signal containing an ordinary photocurrent component;

analog-to-digital converting means for performing analog-to-digital conversion of the photocurrent signal as the ordinary photocurrent component output by said light-receiving means during non-projection of said projecting means;

memory means for storing a digital value of the ordinary photocurrent component converted by said digital-to-analog converting means;

current extracting means for extracting the ordinary photocurrent component from the photocurrent signal output by said light-receiving means during projection of said projecting means on the basis of the digital value stored in said memory means; and arithmetic means for calculating a distance to the object using an output current from said light-receiving means from which the ordinary photocurrent component is extracted by said current extracting means.

6. An apparatus according to claim 5, wherein said light-receiving means includes a position sensing device for generating a pair of photocurrents in accordance with an irradiated position of a reflected light, and said analog-to-digital converting means, said memory means, and said photocurrent extracting means are arranged for each of the pair of photocurrents.

7. An apparatus according to claim 5, wherein said light-receiving means comprises a plurality of photodiodes for generating photocurrent signals in accordance with light-receiving amounts of a reflected light, and said analog-to-digital converting means, said memory means, and said photocurrent extracting means are arranged for each of said plurality of photodiodes.

8. An apparatus according to claim 5, wherein said analog-to-digital converting means includes a sequential comparison type converter.

9. An active distance measurement apparatus comprising:

an infrared-emitting diode for projecting an infrared-ray on a distance measurement object through a projection lens;

an optical position detecting element for receiving, through a light-receiving lens, light reflected by the distance measurement object upon projection of the infrared-ray on the distance measurement object, and outputting a photocurrent corresponding to an irradiated position and an ordinary photocurrent;

an A/D converter for detecting the ordinary photocurrent output by said optical position detecting element prior to a projection operation by said infrared-emitting diode, and converting the ordinary photocurrent into a digital signal;

a digital memory circuit for storing the digital signal converted by said A/D converter;

a current extraction circuit for extracting a current corresponding to a storage value of said digital memory circuit from the photocurrents output by said optical position detecting element during the projection operation; and an arithmetic circuit for outputting a signal corresponding to a distance to the distance measurement object, using an output from said optical position detecting element from which the current is extracted by said current extraction circuit.

10. An active distance measurement apparatus comprising:

projecting means for projecting an infrared-ray on a distance measurement object through a projection lens;

means for receiving, through a light-receiving lens, light reflected by the distance measurement object upon projection of the infrared-ray on the distance measurement object, and outputting a photocurrent corresponding to an irradiated position and an ordinary photocurrent;

means for storing the ordinary photocurrent output by said light-receiving means as a digital signal prior to a projection operation by said projecting means;

means for extracting a current corresponding to a storage value of said storing means from the photocurrents output by said light-receiving means during the projection operation; and means for calculating a distance to the distance measurement object, using an output from said light-receiving means from which the current is extracted by said extracting means.

11. A distance measurement apparatus comprising:

projecting means for projecting a beam toward an object;

light-receiving means for receiving light reflected by the object upon projection of the beam on the object and outputting a photocurrent signal containing an ordinary photocurrent component;

a flip-flop group, a digital output of which a value is sequentially changed in synchronism with a clock pulse;

digital-to-analog converting means for converting the digital output from said flip-flop group into an analog current having a value corresponding to the value of the digital output, and extracting the analog current from the photocurrent signal output by said light-receiving means;

voltage transforming means for converting the analog current output by said digital-to analog converting means into a voltage signal;

comparing means for comparing the voltage signal converted by said voltage transforming means with a reference voltage;

digital memory means for storing a comparison result from said comparing means in association with a change in the value of the digital output by said flip-flop group in a state prior to projection by said projecting means, thereby storing the ordinary current component as a digital value; and arithmetic means for extracting the ordinary photocurrent component from the photocurrent signal output by said light-receiving means on the basis of the digital value stored in said digital memory means during projection of the beam by said projecting means, and calculating a distance to the object using a signal current component obtained in an extracting operation.

12. An apparatus according to claim 11, wherein said light-receiving means has two output means, and said arithmetic means has differential amplifying means for receiving outputs from said two output means.

13. A distance measurement apparatus comprising:
projecting means for projecting light on an object;
light-receiving means for receiving light reflected by the object upon projection of the light on the object, and outputting a photocurrent signal containing an ordinary photocurrent component;
ordinary photocurrent extracting means for storing the photocurrent signal as the ordinary photocurrent component output by said light-receiving means in non-projection of said projecting means, extracting the ordinary photocurrent component from the photocurrent signal in projection of said projecting means, using a storage value, and outputting a signal corresponding to projection, the ordinary photocurrent component being stored as a digital value; and
arithmetic means for calculating an object distance using the signal output by said ordinary photocurrent extracting means.

14. An apparatus according to claim 13, wherein said ordinary photocurrent extracting means comprises analog-to-digital converting means including:
digital-to-analog converting means for generating a current value corresponding to a digital value;
comparing means for comparing to detect a coincidence between the current value generated by said digital-to-analog converting means and the photocurrent signal output by said light-receiving means; and
memory means for storing the digital value obtained when said comparing means detects the coincidence.

15. A distance measurement apparatus comprising:
projecting means for projecting distance measurement light on an object; and
light-receiving means for receiving light reflected by the object upon projection of the distance measurement light on the object to obtain a distance signal corresponding to a distance to the object, said light-receiving means including:
(a) means for detecting an ordinary light component contained in the reflected light in advance, and storing the ordinary light component in the form of a digital signal; and
(b) means for eliminating the ordinary light component from an output from said light-receiving means on the basis of a storage value in said memory means during projection by said projecting means.

16. A distance measurement apparatus for a camera, comprising:
an infrared-emitting diode for projecting an infrared-ray on a distance measurement object;
an optical position detection element for receiving light reflected by the distance measurement object upon incidence of the infrared-ray thereon, and outputting a photocurrent corresponding to an irradiated position;
an analog arithmetic circuit for outputting an analog distance signal corresponding to a distance to the distance measurement object, using an output from said optical position detection element;
an A/D converter for converting the analog distance signal into a digital distance signal;
a control circuit for operating said infrared-emitting diode, said optical position detection element, and said analog arithmetic circuit so as to perform distance measurement operations a plurality of number of times;
a memory circuit in which latest outputs from said A/D converter are sequentially added and accumulated whenever each of the distance measurement operations performed the plurality of number of times is performed; and
a processing circuit for performing digital processing corresponding to arithmetic averaging of data accumulated in said memory circuit upon completion of the distance measurement operations performed the plurality of number of times.

17. A distance measurement apparatus comprising:
projecting means for repeatedly projecting a beam toward an object;
light-receiving means for receiving light components reflected by the object upon repeated projection of the beam, and outputting a photocurrent signal;
arithmetic means for outputting an analog current signal corresponding to a distance to the object, on the basis of a signal corresponding to the photocurrent signal output by said light-receiving means;
a flip-flop group, a digital output of which a value is sequentially changed in synchronism with a clock pulse;
digital-to-analog converting means for generating an analog converted current corresponding to the value of the digital output from said flip-flop group, and extracting the analog converted current from the analog current signal output by said arithmetic means;
voltage transforming means for generating a voltage signal corresponding to the analog converted current output by said digital-to-analog converting means;
comparing means for comparing the voltage signal from said voltage transforming means with a reference voltage;
digital memory means for storing a comparison result from said comparing means in association with a change in the value of the digital output from said flip-flop group, thereby storing a digital value corresponding to the analog current signal output by said arithmetic means; and
accumulating means for adding the digital value stored in said memory means in accordance with the repeated projection by said projecting means to output an accumulated value of outputs from said arithmetic means upon completion of all projection operations.

18. An active distance measuring means comprising:
(a) projecting means for projecting an infrared-ray on a distance measurement object;

(b) light-receiving means for receiving light reflected by the distance measurement object upon radiation of the infrared-ray on the distance measurement object, and outputting an analog signal corresponding to a distance to the distance measurement object;

(c) converting means for converting the analog signal output by said light-receiving means into a digital signal;

(d) control means for operating said projecting means, said light-receiving means, and said converting means a plurality of number of times;

(e) memory means in which latest digital outputs from said converting means are sequentially added and accumulated whenever the plurality of number of times is performed; and (f) arithmetic means for performing arithmetic operations corresponding to arithmetic averaging of the data stored in said memory means.

19. An active distance measurement apparatus for projecting distance measurement light on an object a plurality of number of times, receiving light reflected by the object, and obtaining a digital distance signal corresponding to an object distance, comprising:

memory means for adding and accumulating the digital distance signal whenever each of the distance measurement operations performed the plurality of number of times is performed; and processing means for performing digital processing corresponding to arithmetic averaging of the data stored in said memory means.

20. An active distance measurement apparatus comprising:

(a) projecting means for projecting distance measurement light on an object a plurality of number of times;

(b) light-receiving means for receiving light reflected by the object whenever each of projection operations performed the plurality of number of times is performed and outputting digital data corresponding to a distance to the object; and (c) arithmetic means for adding and accumulating a plurality of digital data from said light-receiving means and obtaining a final object distance on the basis of an accumulation content.

21. A distance measurement apparatus comprising:

projecting means for repeatedly projecting a pulsed light on an object;

light-receiving means for receiving light reflected by the object upon projection of the pulsed light on the object and outputting a photoelectric signal;

arithmetic means for calculating a distance to the object, using a value corresponding to the photoelectric signal output by said light-receiving means; and accumulating means for accumulating outputs from said arithmetic means in accordance with repeated projection by said projecting means, said accumulating means converting an output from said arithmetic means into a digital value, and accumulating a converted digital value.

22. An apparatus according to claim 21, wherein said arithmetic means outputs an analog current corresponding to the distance, and said accumulating means comprises:

analog-to-digital converting means including:

(a) digital-to-analog converting means for generating a current value corresponding the digital value, (b) comparing means for comparing to detect a coincidence between the current value generated by said digital-to-analog converting means and the analog current output from said arithmetic means, and (c) memory means for storing the digital value when said comparing means detects the coincidence; and adding means for adding the digital value stored in said memory means in synchronism with the repeated projection.

23. An apparatus according to claim 21, wherein said light-receiving means, said arithmetic means, and said accumulating means are integrated on a single substrate.

24. An active distance measurement system comprising:

projecting means for projecting distance measurement light on an object; and light-receiving means for receiving light reflected by the object and outputting object distance data, said light-receiving means being constituted by a one-chip IC and including at least:

(a) a light-receiving element for receiving the reflected light from the object;

(b) an analog arithmetic circuit for outputting an analog distance signal corresponding to a distance to the object in accordance with an output from said light-receiving element;

(c) an A/D converter for converting the analog distance signal from said analog arithmetic circuit into a digital distance signal; and (d) a transfer circuit and a terminal for transferring the digital distance signal from said A/D converter to an external processing circuit.

* * * * *